United States Patent [19]

Wesolowski

[11] Patent Number: 4,907,070

[45] Date of Patent: Mar. 6, 1990

[54] TIME BASE CORRECTOR WITH MEMORY MAPPED SYSTEM CONTROL

[75] Inventor: Jan S. Wesolowski, Redwood City, Calif.

[73] Assignee: Ampex Corporation, Redwood City, Calif.

[21] Appl. No.: 355,034

[22] Filed: May 16, 1989

Related U.S. Application Data

[63] Continuation of Ser. No. 788,895, Oct. 17, 1985, abandoned.

[51] Int. Cl.[4] .......................... H04N 5/78; H04N 5/783
[52] U.S. Cl. ....................................... 358/17; 360/9.1; 360/362
[58] Field of Search ........................... 358/17, 19, 149; 360/14.1, 36.1, 36.2, 38.1

[56] References Cited

U.S. PATENT DOCUMENTS

| | | | |
|---|---|---|---|
| 4,015,288 | 3/1977 | Ebihara et al. | 358/19 |
| 4,053,926 | 10/1977 | Lemoine et al. | 358/8 |
| 4,069,499 | 1/1978 | Ninomiya | 358/8 |
| 4,081,826 | 3/1978 | Ninomiya | 358/8 |
| 4,120,000 | 10/1978 | Ninomiya | 358/8 |
| 4,165,524 | 8/1979 | Ninomiya | 360/36 |
| 4,212,027 | 7/1980 | Lemoine | 358/8 |
| 4,270,150 | 5/1981 | Diermann et al. | 360/10 |
| 4,280,199 | 7/1981 | Osakabe et al. | 365/236 |
| 4,321,619 | 3/1982 | Kamath | 358/8 |
| 4,326,216 | 4/1982 | Jensen | 358/8 |
| 4,415,994 | 11/1983 | Ive et al. | 365/189 |
| 4,430,675 | 2/1984 | Fujime | 360/9.1 |
| 4,438,456 | 3/1984 | Yoshinaka | 358/149 |
| 4,482,224 | 11/1984 | Watanabe | 358/339 |

OTHER PUBLICATIONS

Cutler et al., "Microprocessor-Controlled Servo System . . . ", July 1979, pp. 61–76.
"Timebase-Korrektoren und frame-Synchroniser", fernseh-Und Kino-Technik, 1984, No. 6, pp. 253–257 & No. 7, pp. 287–290.

Primary Examiner—James J. Groody
Assistant Examiner—Robert M. Bauer
Attorney, Agent, or Firm—Robert Schumacher; Richard P. Lange

[57] ABSTRACT

A time base corrector is comprised of a plurality of system function modules implementing the functions for time base correcting an analog composite color video signal with a stable reference video signal. The system function modules obtain control data and communicate status data to a system control through a plurality of module function registers located in each module. The module function registers are connected to and selectable by a system bus of a microprocessor. The microprocessor has the module function registers mapped as addresses in its memory space to provide an architecture for communication and control of each function module by the system control.

28 Claims, 17 Drawing Sheets

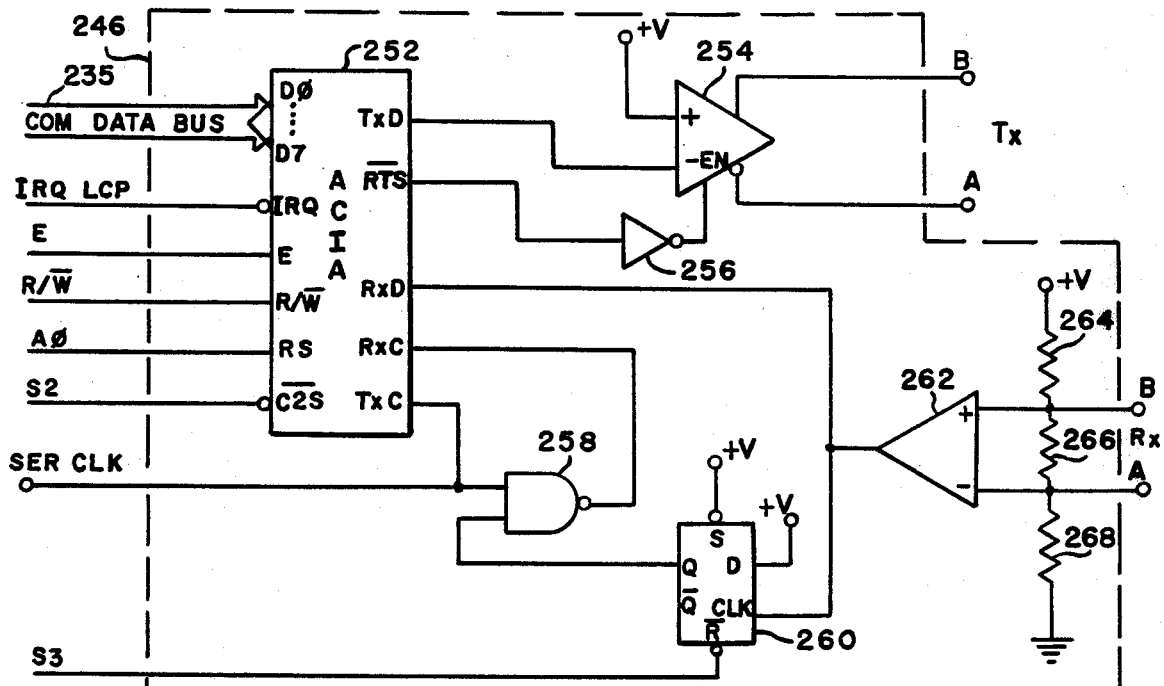
FIG. 7
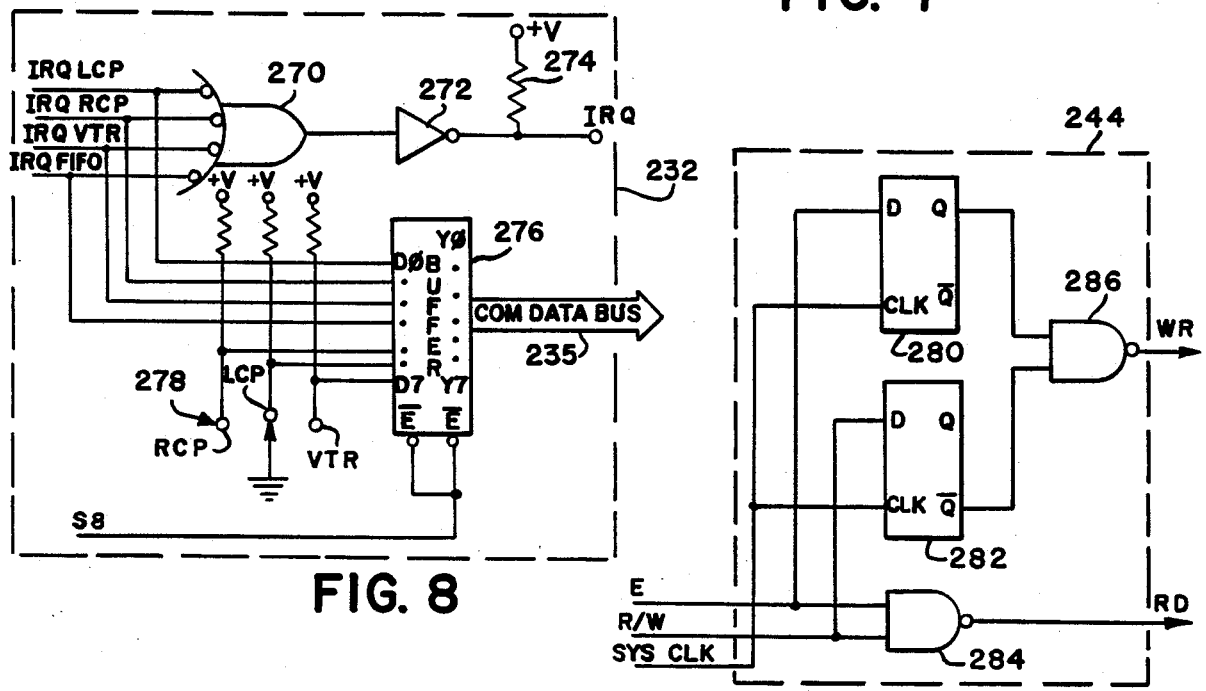
FIG. 8
FIG. 9
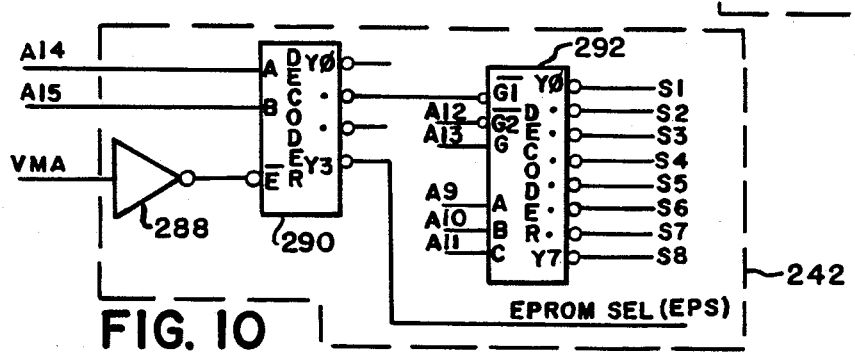
FIG. 10

TIME BASE CORRECTOR WITH MEMORY MAPPED SYSTEM CONTROL

This application is a continuation of application Ser. No. 788,895 filed Oct. 17, 1985, now abandoned.

The invention pertains generally to a time base corrector (TBC) for video signals and is more particularly directed to a time base corrector with a system control, which maps the system control functions of the TBC into the memory space of the control.

In general, time base correctors are used to correct time base errors in information signals introduced into the signals by recording and reproducing them with a memory device. For example, time base errors, which are frequency and/or phase errors, often are introduced in timed or synchronous information signals that are reproduced from a recording medium. One of the recording media for which time base correctors have previously been used is magnetic tape having video signals recorded thereon. Video signals are recorded by a video tape recorder (VTR) on magnetic tape and exhibit time base errors because of the physical characteristics of the system when reproduced from that recording medium.

There are many and various causes of time base errors for video tape recorders including expansion or contraction of the magnetic tape after the video signals have been recorded thereon, variations of the speed at which the magnetic tape is driven during the playback mode from that during recording, variations of the speed at which the record/playback heads scan the magnetic tape during recording and playback modes, etc. If these time base errors are uncorrected, the errors will evidence themselves in the video as jitter, luminance and chrominance distortion, and other undesired aberrations in the reproduced signal.

Many time base correctors today are of a digital form where the video signals are first converted from an analog composite color signal into digital data samples. The digital data are stored in a memory in synchronism with a write or tape clock signal which includes the time base errors. Once a predetermined amount of video signal samples have been stored, they are read out at a synchronous rate by a stabilized clock. The stabilized clock, termed the reference or read clock, substantially retimes the digital data samples and removes the time base errors while at the same time adding some slight delay. This delay is accounted for in other circuitry of the time base corrector before the digital video samples are reconverted to their original analog form. Thereafter, a utilization device may display, further transmit, record, or process the video signals free of the time base errors.

The system philosophy or control of these previous digital time base correctors has been based on hard wired logic and digital circuitry which perform only predetermined control and processing functions. Any substantial modification of the control or system functions of such time base correctors after the design was set has been extremely difficult and expensive, and many times impossible, because the change of one function impacts many of the other functions downstream in the data flow in complicated time base correctors. All the processing of the video signals internal to the time base corrector was done either in their analog form or in the digital form by dedicated processing logic which sharply limited the quality of the processing, or increased the size and price of the system dramatically.

Generally, microprocessor based controls are known for controlling digital circuitry but have not been used extensively for TBC processing and control because most processing in the video data path of a TBC device must be accomplished at a rate faster than such controls can operate. However, it would be extremely advantageous to use the flexibility and programmability of a microprocessor based control in a TBC to provide control of those system functions which can be done at a rate less than the video signal processing rate.

SUMMARY OF THE INVENTION

The present invention provides a system control for a time base corrector which increases the processing capabilities of the apparatus for video information, provides a method for the easy expansion and modification of system functions, decreases the cost of processing the data for particular system functions, and provides fast acquisition, processing, and transfer of various control data from external sources to the device, of various control data generated internally and used externally, or of various control data generated internally and used for other internal functions.

The system control is implemented as a microprocessor based control and processing system which communicates with a plurality of system function modules forming a time base corrector and with a plurality of system peripheral devices. The system function modules are used to process video data at an extremely high video rate while the system control processes information and control data which is used at a slower rate. The communication is by means of a bidirectional system data bus and a multiplicity of system function registers. The function module registers act as memory locations mapped in the memory space of the system control such that each system function module which is controlled is assigned a portion of the addressing space of the system control. The function module registers interface each system function module with the system control through the system data bus and a system address bus and provide means for a control microprocessor of the system control to select and send commands or data to the modules or to select and receive data or status information from the modules. The address bus of the system control is decoded by a memory mapping means which enables each function module register in response to a particular address read or write operation of the control microprocessor. In the preferred implementation of the invention, the address bus is decoded into a module select address of a plurality of bits which enables all the registers in a chosen system module, and a module register address of a plurality of bits selecting a particular register within the chosen system module.

The system control is implemented in this manner to provide a sophisticated memory mapped control for time base corrector information transfer, control, and processing functions. The system control communicates control and data to any of the function modules of the time base corrector by writing that information to a particular set of registers (addresses of memory) assigned to that module, and further obtains data and status information from any module by reading that information from a particular set of registers (addresses of memory) assigned to that module.

The data obtained from one module can be processed in the system control and then returned to that module or, alternatively, processed and then transmitted to another module. Still further, some of the memory mapped system addresses may be assigned to external devices interfacing with the system control microprocessor. These devices may include system mode selection switches, a local control panel interface, a remote control panel interface, diagnostic select switches, diagnostic message display devices, and VTR interface. The system control can obtain and process data from these external devices and, in combination with the status and data received from any module, control that module or provide the information about the module to an external source.

These and other objects, features, and aspects of the invention will be readily apparent from, and more fully described by, the following detailed description, particularly when taken in conjunction with the appended drawings wherein:

BRIEF DESCRIPTION OF THE DRAWINGS

FIG. 7 is a detailed electrical schematic of the local control panel serial data port of the serial data communications processor illustrated in FIG. 6;

FIG. 8 is a detailed electrical schematic of the interrupt control of the serial data communications processor illustrated in FIG. 6;

FIG. 9 is a detailed electrical schematic of the read/write control of the serial data communications processor illustrated in FIG. 6;

FIG. 10 is a detailed electrical schematic of the memory map of the serial data communications processor illustrated in FIG. 6;

DETAILED DESCRIPTION OF PREFERRED EMBODIMENT

Figure 1:
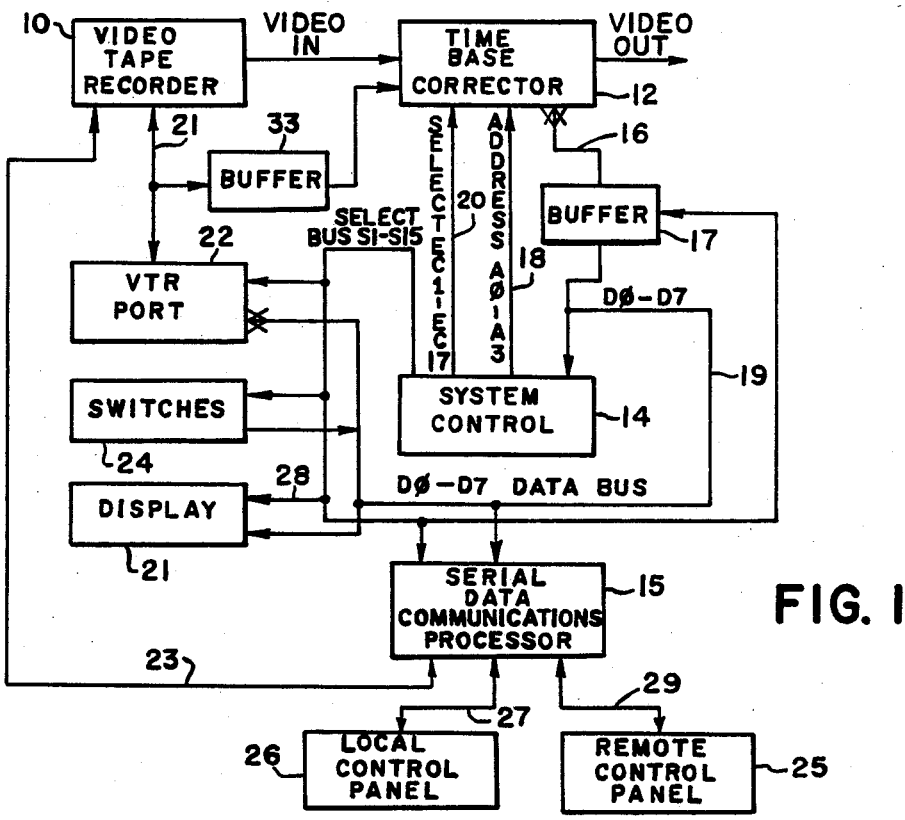
FIG. 1 is a system block diagram of an information recording and reproducing system having a video tape recorder and a time base corrector with a system control constructed in accordance with the invention.

Referring now to the figures, in particular FIG. 1, there is shown a time base corrector (TBC) 12 with a microprocessor based system control 14 which maps the system functions of the TBC into the memory space of the system control. The system control 14 communicates with the time base corrector 12 via a system bus comprising a bidirectional system data bus 16 having an 8-bit wide data path DO-D7, a system address bus 18 having four address selection lines AO-A3, and a system select bus 20 having a plurality of select lines EC1--EC17. Video information, for example, in the form of a VIDEO IN signal from a video tape recorder (VTR) 10, is input to the time base corrector 12 and is output as a signal VIDEO OUT when the phase and frequency errors of reproducing the signal from the magnetic tape medium have been corrected. The system control 14 directs and controls this correction process by communicating commands and data information over the system data bus 16 to system control registers contained within system function modules of the time base corrector 12. Further, the system control 14 receives data and status information from system data registers within modules of the time base corrector 12 via the data bus 16. The system control 14 communicates with the system data bus 16 through a buffer 17 via a microprocessor data bus 19.

The direction of transfer and the selected system registers for reading or writing are chosen by information provided on the address bus 18 and system select bus 20. Real time control of the TBC 12 from the VTR 10 may be accomplished via a buffer 33 from a digital data path 21. Further information from the VTR 10 over the digital data path 21 may be input to the system control through a VTR interface port 22. This VTR real time data may be processed before developing commands and information which are sent to the time base corrector 12. Additionally, a number of control switches 24 are provided to describe the system modes and other information needed by the time base corrector for performing its operations. The switches 24, the VTR interface port 22, and a display 212 are connected to a select bus 28 and communicate with the system control via the microprocessor data bus 19 in a manner similar to that described for the system function registers.

The system control 14 further communicates with a serial at a communications processor 15 for inputting serial data to the device from either the control panel of the video tape recorder 10 via a serial data channel 23, from a local control panel 26 via a serial data channel 27, or from a remote control panel 25 via serial data channel 29. The serial data channels 23, 27, and 29 connect to serial ports of a serial communication processor which forms part of the system control 14. The control panel for the VTR 10 or the remote control panel 25 can be used via the serial data ports to control the TBC 12 at locations remote from the actual apparatus. All three control panels are substantially similar in function and can therefore be used interchangeably to control the TBC 12.

Figure 2:
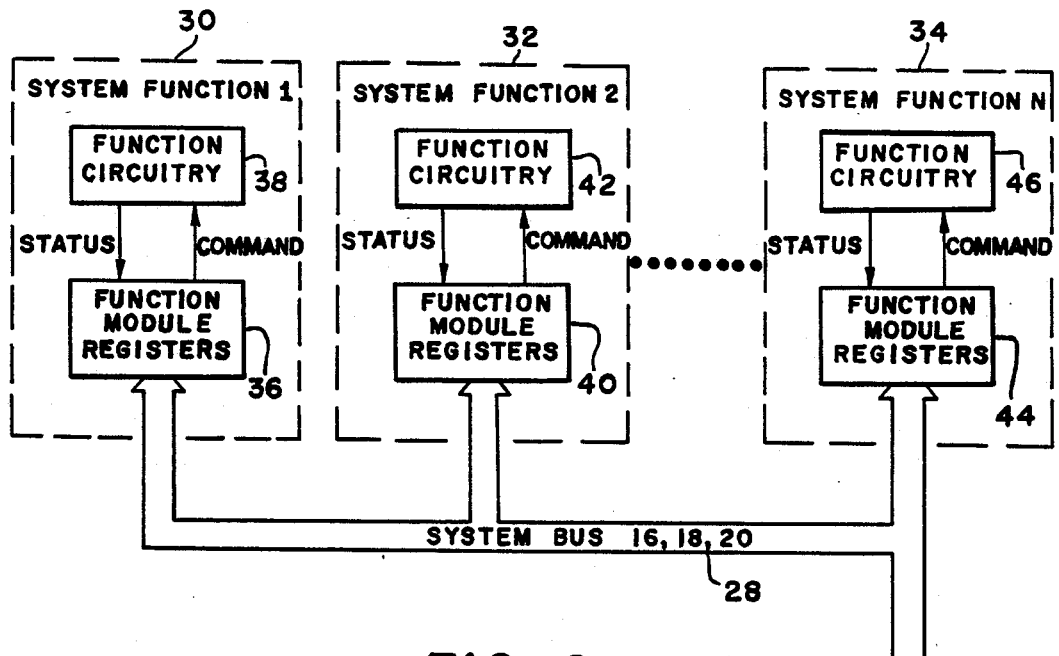
FIG. 2 is a functional block diagram of the modular construction of the time base corrector of the system illustrated in FIG. 1.

The functional circuitry of time base corrector 12 is divided into modules 30, 32, ... 34, as shown in FIG. 2. The system function 1 is provided by the module 30 which contains function circuitry 38 and is controlled by data in control registers of the system function registers 36. The function circuitry 38 communicates status and data through data registers of the system function registers 36. This information is transferred to and from the system control 14 by the system bus. Similarly, for system function 2, the module 32 contains function circuitry 42 and a set of system function registers 40 which provides for communication to the system control 14 via a system bus. In a similar manner, all of the system modules including the module 34 for complementing system function N and containing function circuitry 46 and system function registers 44, are of similar construction. Each of the control messages or information transfer to the modules 30, 32, ... 34 from the system control 14 are through the memory mapping scheme communicated by the system bus. Each of the sets of system function registers for the modules allows data to be either read from or written to specific memory locations by the system control 14 to produce advantageous communications between modules, the system control and individual modules, and external or peripheral devices and the modules.

The system function modules 30, 32, ... 34 providing actual TBC functions are hard wired to produce certain video data flows, control functions, and processing to form a TBC but are simpler than prior circuitry performing the same function as the processing of data between modules and/or control data can be passed through and processed by the system control 14.

Figure 3:
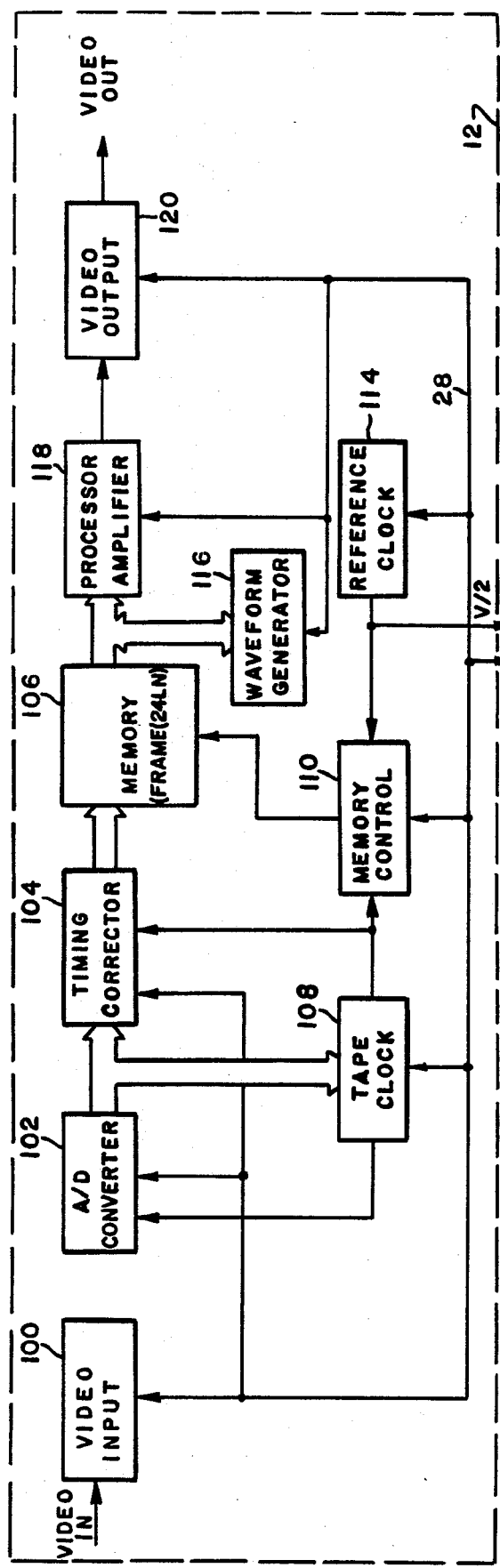
FIG. 3 is a detailed functional block diagram of one implementation of the time base corrector of the system illustrated in FIG. 1 illustrating particular function modules.

A time base corrector 12 formed of a plurality of system function modules is more fully illustrated in FIG. 3. The video input signal which is normally an analog color composite signal of a particular standard (NTSC, PAL, PALM, SECAM), enters a video input module 100. The video input module 100 performs the function of conditioning such as filtering and clamping, and extracting synchronizing components from a composite color video signal from a source such as the VTR 10. By active video signal, what is meant is those data which contain picture (luminance and chrominance) information rather than control and timing information. The analog to digital converter module 102 converts the analog video signal into digital samples at some specified multiple of the subcarrier frequency, in our example, 4 fsc.

These digital samples are transmitted to a timing corrector module 104. The timing for the A/D conversions and input to the timing corrector 104 are produced by a tape clock module 108 which receives the converted samples to generate a tape clock signal including time base errors, representing exactly timing positions of the incoming analog signal. The timing corrector 104 uses the tape clock and a reference clock to correct relatively fine timing errors in the digital samples and passes the samples on to a larger memory 106 which can be large enough to store a video frame (525/625 horizontal lines, depending on the TV standard). The writing and reading from the video memory 106 is under the direction of a memory control module 110 which writes the digital data samples from the timing corrector 104 into the memory 106 and reads that memory with a frequency stabilized and error free clock generated by a reference clock module 114. The reference clock signals of the module 114 are input to the memory control 110 along with the clock signals from the tape clock 108 to provide the synchronized writing and reading necessary for the memory to correct gross time base errors.

The digital samples are then input to a processor amplifier 118 where they are multiplied by a video gain value supplied by the system control. The system control additionally supplies a black level value which is added to the video data. The video data is then combined with data representing the synchronizing horizontal and vertical pulses, the burst frequency and that other control information (depending on the TV standard) of a composite color signal which was stripped prior to time base error correction. The digital composite color video signal is then output to the video output module 120. The video output module 120 performs digital to analog conversion and conditioning to provide a video output for utilization devices connected to the signal VIDEO OUT. The system control 14 communicates with all these modules over the common system bus to provide information acquisition, control, and processing between the modules.

Figure 4:
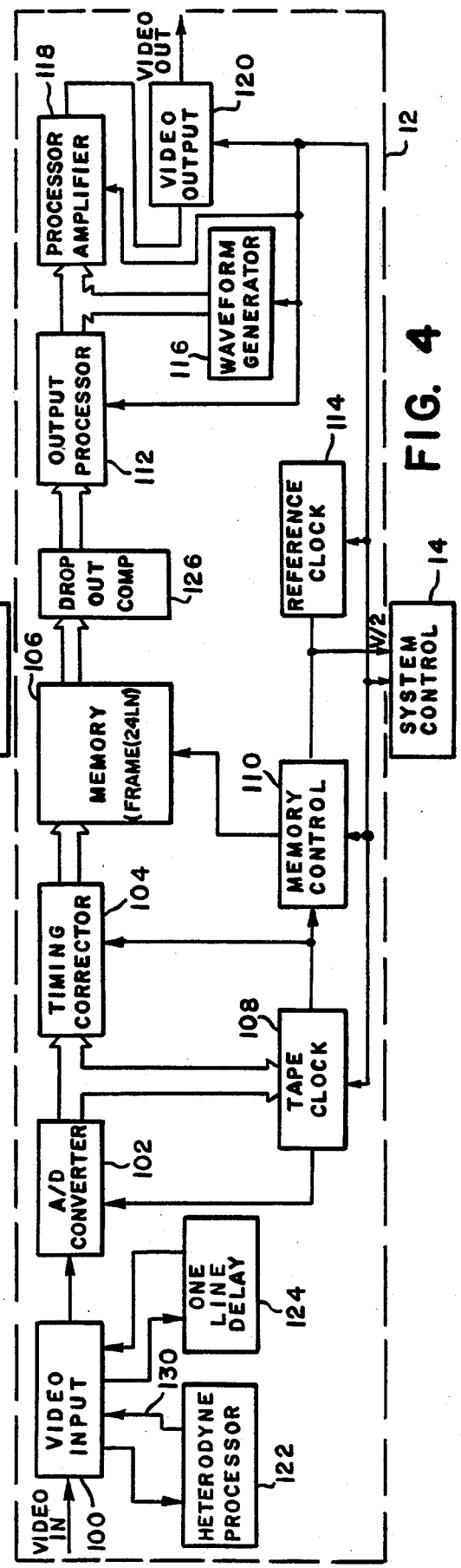
FIG. 4 is a detailed functional block diagram of an alternative implementation of the time base corrector of the system illustrated in FIG. 1 illustrating additional optional function modules.

Because of the modularity of the system function modules, new operations and capabilities can be included in the TBC without completely redesigning the other modules. Modifications may be made to the system concept without interrupting the functions already included therein and can be safely integrated with a minimum of design change. For example, FIG. 4 shows a modular TBC substantially identical with that of FIG. 3 where a number of additional function modules have been provided. A heterodyne processor 122 receives an input video signal having a subcarrier which is incoherent with respect to its horizontal sync pulses and processes such video signal so that it may be returned to the video input module 100 via a connecting line 130 in a coherent manner. Similarly, for other functions, a one line delay 124 normally takes the input video signal and delays such information for a one horizontal line of the information before returning the video signal to the video input module 100. A third function which has been added is a dropout compensation module 126 disposed between the memory module 106 and an output processor module 112. The dropout compensation module 126 corrects errors caused by physical defects in the tape or loss of head to tape contact during scanning. These dropouts or missing portions in the incoming video signal are identified and corrected in this module before passing the data samples on to the output processor module 112.

The output processor module 112 performs color correction, level shifting and phase error adjustment for color processing of video signals from the VTR which are of nonstandard speed. Nonstandard speed means such operations as shuttle, still frame, fast forward, or slow motion types of operations for the VTR 10.

As was the case for the modules of FIG. 3, the additional modules of FIG. 4 are connected to and communicate with the system control 14 via the system bus 28. They additionally contain system function registers which enable them to receive commands and data from the system control 14 and deliver data and status information to the system control. The flexibility of configuring a TBC with a memory mapped system control is readily evident. Optional modules for other functions can be added or deleted as the system user determines a need. In general, each module communicates with the processing module upstream and downstream from it in the video data flow, with the particular clocks for the timing signals, and with the system control 14 over system bus 28. Control or transfer information between widely separated modules in the video data flow path is handled either by the system control or within the respective module itself.

Figure 5:
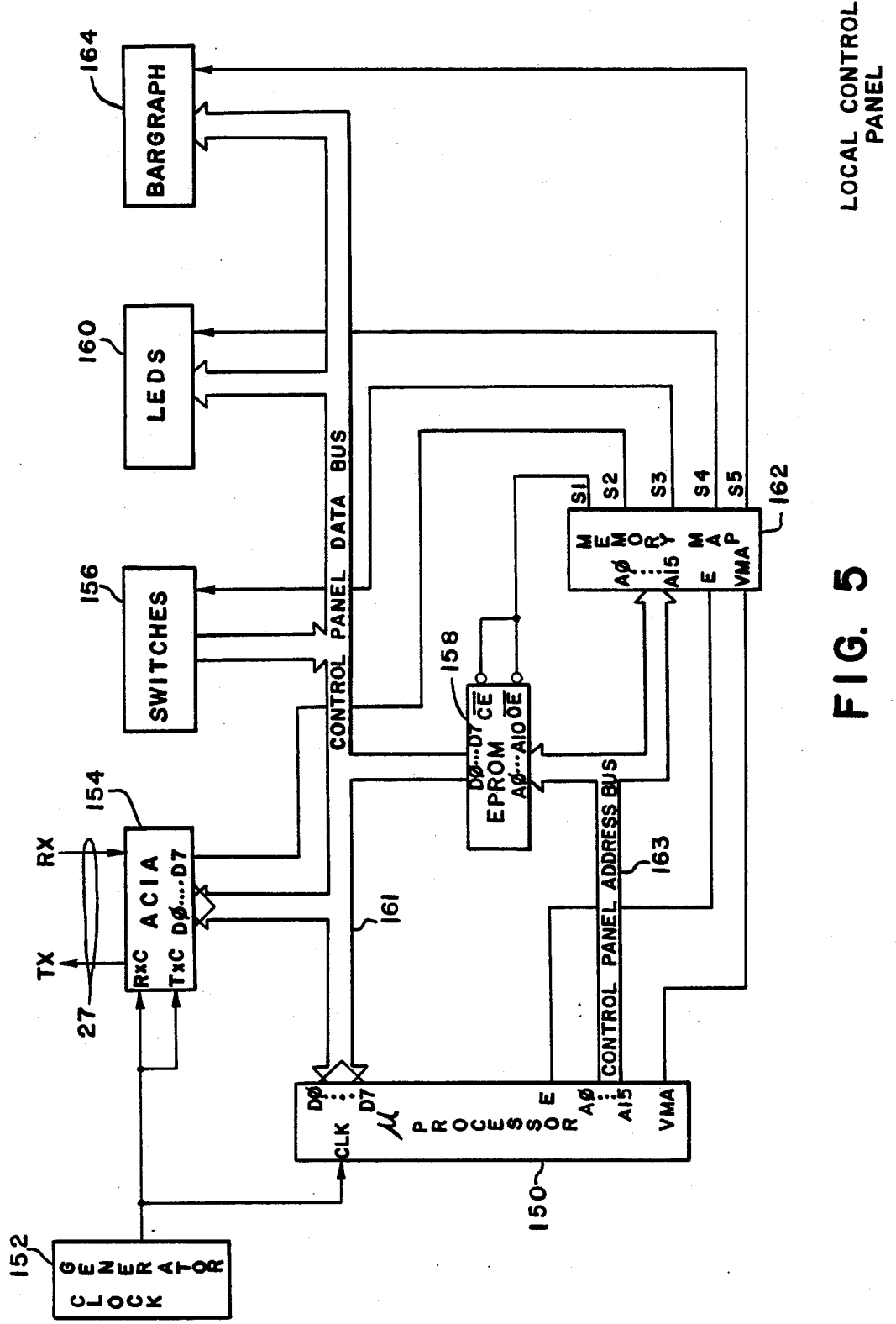
FIG. 5 is a detailed electrical schematic diagram of the local control panel of the system illustrated in FIG. 1.

FIG. 5 illustrates an electrical block diagram of one implementation for the local control panel 26. It is to be understood this is not the only implementation of the local control panel but merely an advantageous one that can be used for illustration. Further, it is evident that the remote control panel 25 or the control panel of the video tape recorder 10 can be implemented in a similar manner. The local control panel itself can be detached from the TBC and installed in a remote place, thus playing the role of a remote control panel.

The control panel 26 is implemented as a microprocessor controlled communication device which includes a microprocessor 150 and a number of peripherial elements. The peripheral elements include a EPROM 158 which stores the control program of the microprocessor 150 and a memory map 162 which the microprocessor uses to select the peripherial devices. The memory map 162 selects the peripheral devices by decoding the address signals AO–A15 of the control address bus 163 in combination with an enable clock signal E and a valid memory address signal VMA from the microprocessor 150. The memory map 162 generates select signals S1–S5 from the address signals AO–A15 to enable the EPROM 158, an asynchronous communication interface adapter (ACIA) 154, a plurality of operator controlled switches 156, a plurality of operator readable LEDS 160, and a bargraph display 164.

The microprocessor 150 under program control according to the stored sequence of instructions in EPROM 158 causes the switches 156 to be read over the control panel data bus 161 to indicate the operator actuation of a particular function. These operator commands from switches 156 are processed in the microprocessor 150 and then transmitted to the system control 14 through the ACIA 154. Further, the system control 14 communicates status information about the time base corrector 12 through the ACIA 154 to the microprocessor 150. This status information is processed into operator readable data and displayed on the LEDS 160 and the bargraph 164. (describe inputs)

Figure 6:
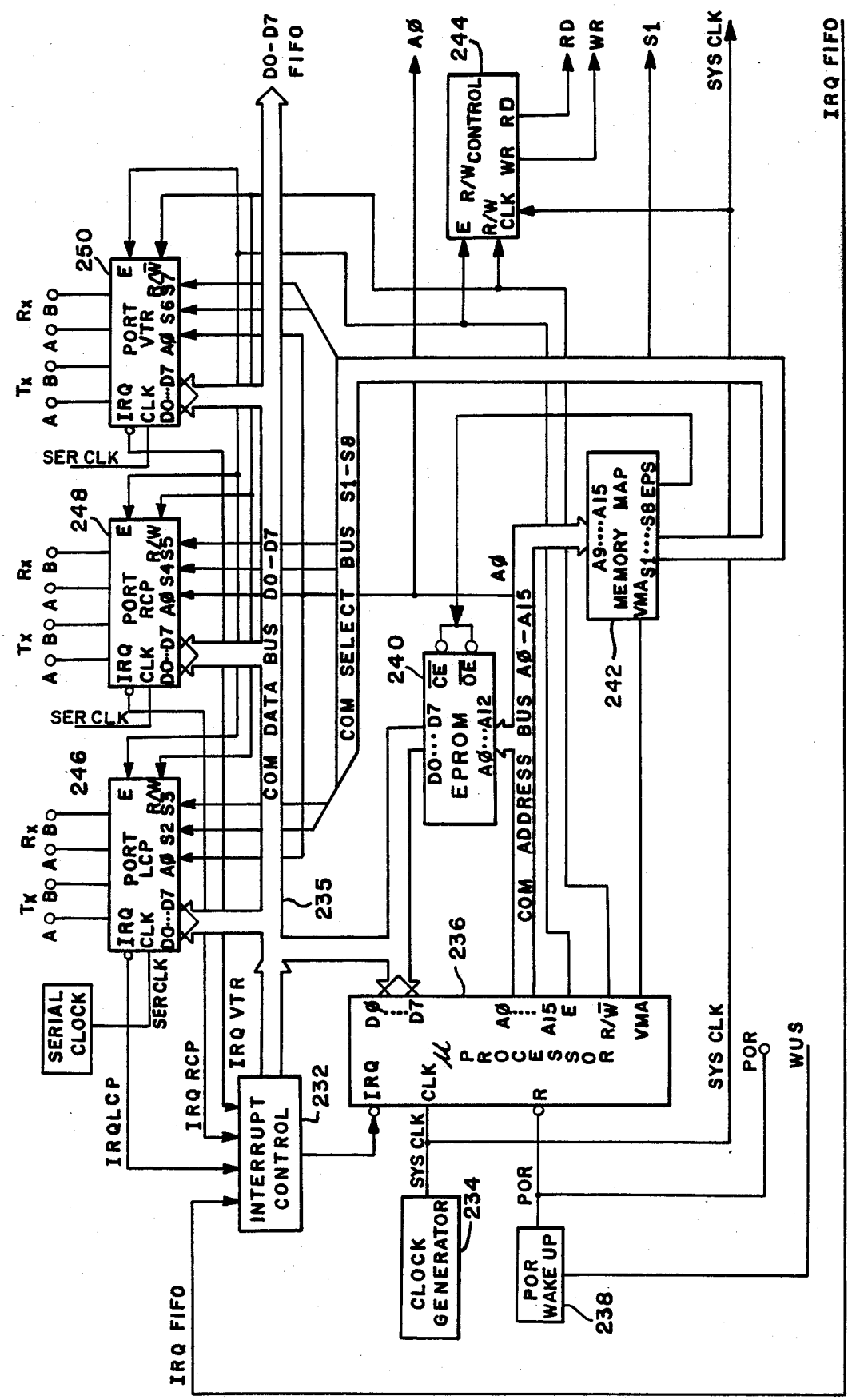
FIG. 6 is a detailed electrical schematic of the serial data communications processor of the system illustrated in FIG. 1.
Figure 11:
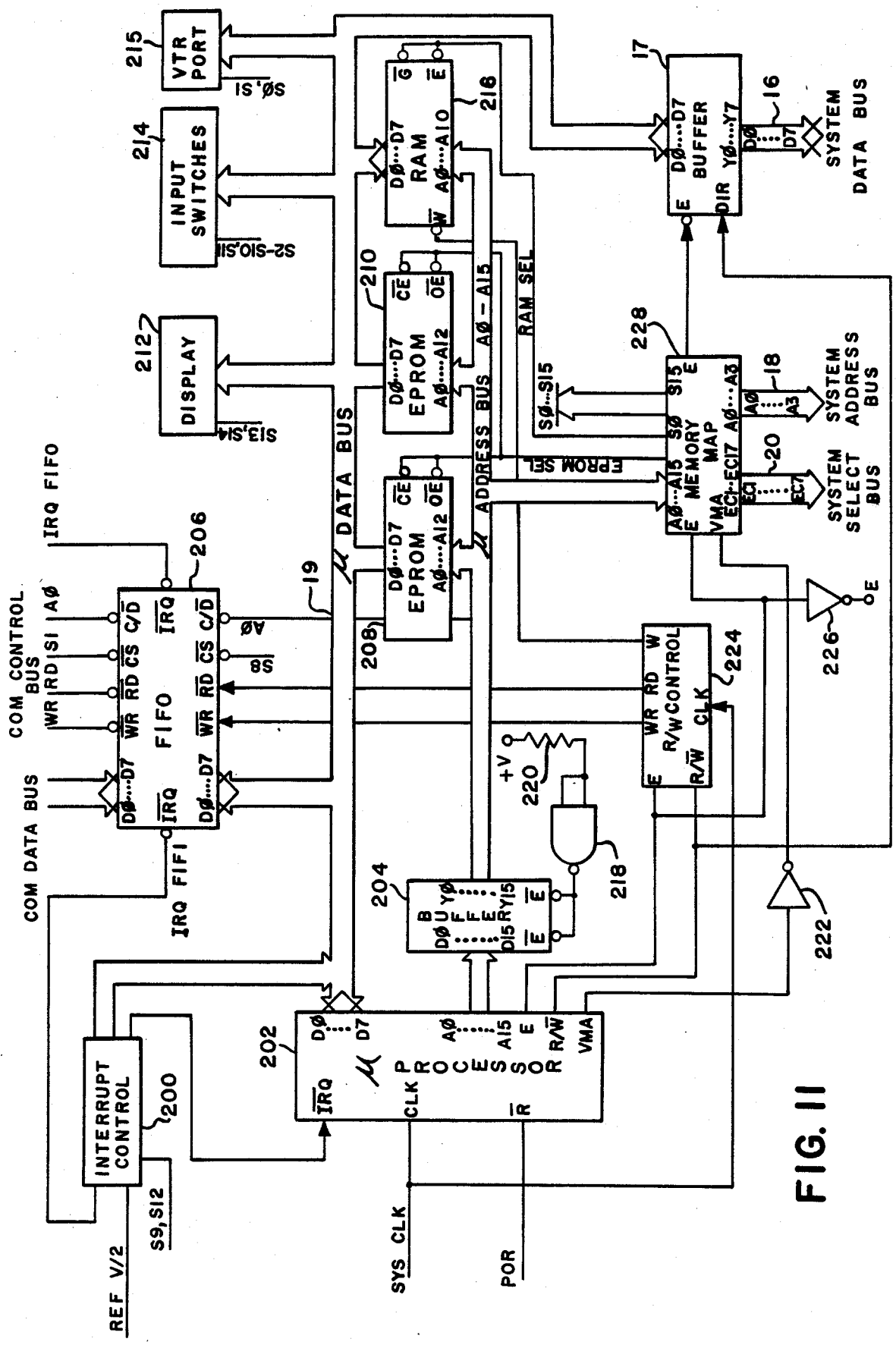
FIG. 11 is a detailed electrical schematic of the system control of the serial data communications processor illustrated in FIG. 1.

FIG. 6 is detailed electrical schematic of the serial data communications processor 15 which is connected to the local control panel 26 by an LCP port 246, to the remote control panel 25 by an RCP port 248, and to the video tape recorder 10 by a VTR port 250. The serial data communications processor 15 receives serial data from one of these three sources and converts it into message blocks which can be communicated to the system control processor through a FIFO buffer 206 (FIG. 11). Each peripherial device is connected to its respective port by a transmit line Tx having conductors A and B and a receive line Rx having conductors A and B. Bit serial data are communicated to the peripheral device via the transmit line Tx and bit serial data are received from the periphial device via receive line Rx. Each port, for example, port 246 assembles the serial data from the receive line Rx and forms an 8-bit parallel word which can be transmitted to the microprocessor 236 over the communications data bus 235. The port further receives data from a microprocessor 236 via a communication data bus 235 in 8-bit parallel form and serializes them to transmit them to a peripherial device via the transmit line Tx. The ports have provision for receiving commands and delivering status data. Each port is enabled by a select line from the communications select bus S1–S8. The select line S2 is used to enable the LCP port 246, the select line S4 is used to enable the RCP port 248, and the select line S6 is used to enable the VTR port 250.

The address line AO from the microprocessor 236 provides a means for determining whether or not the data supplied to the communications port are transmit data or commands, for a write function, or whether they are receive data or status, for the case of a read function. The select lines S3, S5 and S7 individually enable specialized functions for the serial data ports which allow them to detect a special character of a high level serial data protocol, such as a break character for SMPTE protocol RP113. This specialized function will be more fully described hereinafter. The microprocessor 236 has an enable clock output E connected to similarly labeled inputs of the serial ports 246, 248 and 250 to provide timing synchronous with the cycles of the microprocessor 236. Each serial port has an interrupt request IRQ with which it signals the microprocessor 236 when its receive buffer is full and it has assembled a word for transmission to the microprocessor, or when its transmit buffer is empty and it has serialized the last word received from the microprocessor.

The select lines are developed by a memory map circuit 242 which decodes address lines A9–A15 into the individual select signals S1–S8. Further, the memory map circuit 242 decodes the address lines into the memory enabling signal EPS which is applied to an EPROM 240. The memory map accomplishes the decoding of the address bus lines in conjunction with a valid memory address signal VMA from the microprocessor 236. This synchronizes the selection of external memory with the internal cycles of the microprocessor 236.

The direction of the data flow either to the microprocessor 236 or away from it is determined by a read/write control 244. The read/write control 244 receives a system timing clock signal from a system timing clock 234 (which may be a crystal controlled 4.0 MHz. signal), an internal timing clock signal E, and the read/write control signal R/*W from the microprocessor 236. The R/W control 244 transforms these three signals into signals WR and RD, respectively, which control the direction of data flow to or from the FIFO buffer 206. Also used to control the FIFO buffer 206 is the address line AO which connects to the C/*D input of the device. The logic level on this line indicates to the FIFO buffer 206 that the command or data information is delivered to the device, in the case of a write operation, or status or data is being read from the device, in the case of a read operation. The select line S1 from the memory map circuit 242 enables the device by its coupling to the *CS input. The FIFO buffer 206 alerts the microprocessor 236 that it contains data or a message for the device by an interrupt request signal IRQ FIFO.

The serial data communications processor 15 uses an interrupt control 232 to alert it that a peripheral device needs to be communicated with. The interrupt requests IRQ FIFO, IRQ LCP, IRQ RCP, and IRQ VTR are received by the interrupt control 232, and the control develops an interrupt signal to the IRQ input of the microprocessor 236 if any are present. The microprocessor 236 can then transfer control to an interrupt service routine which interrogates the interrupt control 232 by means of the communications data bus D0–D7 to determine which device is requesting service. In the interrupt control circuit 232 there is a selection switch which allows only one control panel at a time to control the system control through the serial communication processor. If the VTR control panel or the remote control panel has been selected as a source of control for the TBC, then the local control panel is active only as an indicator of the TBC control and operation status. Therefore, the interrupt control 232 generally determines the priority of the interrupts between the controlling serial port, either 246, 248 or 250, and the FIFO device 206.

FIG. 7 illustrates a detailed electrical schematic of a serial data port for the local control panel. However, it will be evident that the serial communications ports 248 and 250 for the remote control panel 25 and for the control panel of the VTR 10 can be similar in configuration. The serial port 246 includes a synchronous communications interface adapter (ACIA) 252. This device is preferably a standardized chip from the 6800 series integrated circuit family manufactured by the Motorola Corporation of Schaumburg, Ill. The integrated circuit illustrated is a MC 6850, and its operation is more fully described in the Motorola 6800 family technical specifications published by the same corporation.

The ACIA 252 includes bidirectional data terminals D0–D7 connected to the communication data bus 235. Transmit data and control information are passed from the communications microprocessor 236 to the ACIA 252 via these terminals, and receive data and status information are passed by the ACIA 252 to the communications microprocessor 236 through these terminals. The transfer of data between the microprocessor and the ACIA 252 is run synchronously with the enable clock signal E which is supplied to all the serial ports such that a standardized serial data protocol is established. The read/write control input R/*W of the ACIA 252 is connected to the read/write control output R/*W of the communications microprocessor 236 and determines the direction of the data transfer from the ACIA.

The determination of whether digital information is data or control information, in the case of a write operation, or data or status information, in the case of a read operation, is supplied by a logic level signal from the microprocessor address line AO which is connected to the register select input RS of the ACIA 252. Information transferred to or from the ACIA 252 is data if the signal line AO is a high logic level, and is control or status information if the line is a low logic level. The ACIA 252 is enabled for operation by a low logic level signal from the select line S2 at its *C2S input.

The ACIA 252 further includes a serial data output TxD which is connected to the inverting input of a biphasic line driver 254. The noninverting input of the line driver 254 is connected to the positive logic voltage +V. A signal *RTS from the ready to send output of the ACIA 252 is buffered and inverted in an inverter 256 before being applied to the enabling input EN of the line driver 254. Serial data output from the TxD output is transmitted on the transmit line Tx as a biphasic signal (plus or minus logic levels) between conductors B and A to a receiving device (ACIA) at the local control panel 26 attached to the particular communication port. Once the ACIA 252 is commanded to transmit, it will, in synchronization with a transmit clock applied to its TxC input, send serial data bits to the line driver 254 until an internal transmit register is empty.

For receiving serial data information in an asynchronous manner, the ACIA 252 is connected to the output of a line receiver 262 via its received input RxD. Biphasic conductors B and A of the receive line Rx are connected to the serial data channel 27 and receive data from the ACIA of the local control panel 26 connected thereto. The line receiver 262 receives biphasic serial data via a network of resistors 264, 266 and 268 connected between a source of positive logic voltage +V and ground. The noninverting input of the line receiver 262 is connected to one terminal of the center resistor 266 of the network, and the inverting input of the line receiver is connected to the other terminal of the resistor 266. The line receiver 262 buffers and converts the biphasic digital information of the receive channel Rx into a single logic level signal to be input at the receive input RxD of the ACIA 252.

Transmission and reception of serial digital bits are timed by transmit clock signals and receive clock signals, respectively, which are generally produced at the same baud rate. In this particular implementation, a serial clock signal is generated at a 614.4 kHz. rate. It is then internally divided by 16 in the ACIA, to clock the serial data at 38.4 kbaud rate. The serial data clock signal is applied to the transmit clock input TxC of the ACIA 252, and the same clock signal is applied to the receive clock input RxC of the ACIA 252 through a NAND gate 258. The receive clock signal, applied to the RxC terminal from the serial clock signal, is enabled and disabled by the logic level of the Q output of a D-type bistable 260. The bistable 260 has its direct set input *S and similarly its D input connected to a positive logic voltage +V. The bistable 260 has its clock input CLK connected to the output of the line receiver 262. The bistable 260 can be reset by a select signal S3 generated by the memory map means 242 of the serial data communications processor 15 applied to the direct reset input *R of the bistable.

In operation, the ACIA 252 receives data bytes from the serial communications microprocessor 236 over the communications data bus 235 and stores them in an internal transmit register until a command is given to transmit them. The ACIA 252 thereafter lowers the *RTS output to a low logic level enabling the output line driver 254 and simultaneously serializes the bits stored in the transmit register. The ACIA 252 while transmission is taking place will add a start bit, parity bit, and stop bit to each serial word. The serial data bits are transmitted at the timed intervals determined by the transmit clock until the transmit register is empty. The condition indicating the transmit data buffer is empty can be signaled to the microprocessor 236 by an interrupt to its IRQ input from the ACIA 252.

At this point, the read mode can be activated to transfer data from a receive register in the ACIA 252 via the communications data bus 235 to the communications microprocessor 236. The receive register is filled asynchronously from the line receiver 262 which provides data to the RxD input of the device. When the receive register is full, it signals the condition by interrupting the communications microprocessor 236 with a *IRQ signal. The receipt of serialized data from the line receiver 262 is timed by the receive clock signal at the RxC input to divide the serial data into separate bit intervals for concatenating them into words. The ACIA 252 strips start, parity, and stop bits from the serialized data before transmitting them in an 8-bit word format to the communications microprocessor 236.

The configuration illustrated acts in combination with software in the communications microprocessor 236 to be able to handle high level serial data communications protocol such as the SMPTE recommended practice RP113. In general, when the ACIA 252 is idle, the first framing error of the device detected by the communications microprocessor 236 will be taken as the start of a break character. In response, the communications microprocessor 236 will reset the bistable 260, disabling the receive clock signal by blocking the NAND gate 258. The end of break will cause a particular bit transission from the line receiver 262 which will clock the bistable 260 to enable the NAND gate 258 and cause the ACIA 252 again to receive the serial clock signal in a retimed manner.

The operation and description of the serial data port 246 is more fully detailed in a copending application, filed on Oct. 17, 1985, in the name of Jan Wesolowski, entitled "Serial Data Communications System." The disclosure by Wesolowski is hereby incorporated by reference herein.

FIG. 8 is a detailed schematic of the interrupt control 232 for the serial data communications processor 15. The interrupt control 232 comprises a four input NOR gate 270 and an inverter 272, and further comprises a buffer 276. The interrupt requests IRQ LCP, IRQ RCP, IRQ VTR and IRQ FIFO are input into the NOR gate 270 to provide a low signal at the output of the inverter 272 when any of those signals are a low logic level. A low logic level on the output of the inverter 272 grounds the IRQ input of the microprocessor 236 which had previously been pulled up to a positive voltage +V via a pull up resistor 274. Thus, when any of these request signals are present, an interrupt is recognized by the microprocessor 236.

In response to the interrupt the microprocessor 236 will, after a transfer to an interrupt service routine, produce a low logic level on the select line S8 output of the memory map 242. This will enable the buffer 276 to pass the interrupt request signals from its DO-D7 inputs to its Y0-Y7 outputs. The outputs of the buffer 276 are connected to the communications data bus 235 and provide a means for reading the interrupt requests into the microprocessor 236. The data word read into the microprocessor 236 when the select line S8 is at a low logic level will have stored the interrupt request as a low bit value in a particular position. From this bit position the microprocessor 236 can make decisions to determine the program data path from that point.

Further, connected to data inputs D5-D7 are the terminals of a single-pole triple-throw switch 278. Each throw or switch position represents one of the serial data ports 246, 248, 250. The movable slide of the switch 278 is grounded through the single-pole and selecting a position grounds one of the inputs of the buffer 276. Enabling the buffer 276 and reading the data bus will allow the microprocessor 236 to determine the position of the switch 278. As was the case for the interrupt request, a selected switch position will show up in the data word read in from the communication data bus 235 as a low logic level. Because the other terminals are pulled up by resistors, unselected switch positions will show up in the data word as a high logic level. In this manner the microprocessor 236 can determine if an interrupt has occurred, which interrupt has occurred, and which control panel has regulation of the system control.

FIG. 9 will now be more fully described to disclose the detailed electrical schematic of the read/write control 244 of the serial data communication processor 15. The read/write control 244 of the serial data communications processor receives the signals . SYS CLK, R/*W, and E. The SYS CLK signal is the signal from the system clock 234 and is applied to the CLK inputs of two D-type bistables 280 and 282, respectively. The R/*W signal or the read/write control line from the microprocessor 236 is applied to the D input of the bistable 282 and one input of a NAND gate 284. The signal E for the external clock signal is applied to the D input of the bistable 280 and to the other input of the NAND gate 284. The Q output of the bistable 280 and the *Q output of the bistable 282 are applied to a NAND gate 286. The output of the NAND gate 284 generates the read signal RD, and the output of a NAND gate 286 generates the write signal WR.

When the R/*W signal is a high logic level and coincides with a high logic level of the signal E, the NAND gate 284 generates the signal RD as a low logic level. Alternatively, when the R/*W signal is a low logic level and the signal E is a high logic level, these levels are clocked into the bistables 280 and 282 by the falling edge of the system clock signal SYS CLK. A high level input to bistable 280 sets it and a low level input to bistable 282 resets that device. These signals thus enable NAND gate 286 to generate a signal WR, which is a low logic level. The generation of the WR signal is synchronous or clocked by the system clock signal SYS CLK to produce the signal at an alternate phase of the clock from when the RD signal is generated.

With respect now to FIG. 10, there is shown the detailed electrical schematic of the memory map means 242 for the serial data communications processor 15. The memory mapping means 242 comprises two decoders 290 and 292, respectively. The decoder 290 receives address lines A14 and A15 of the microprocessor at its decode inputs A, B, respectively. Further, the valid memory address signal VMA from the microprocessor 236 is connected to the enable input *E through an inverter 288. By selecting a particular bit combination on address lines A14-A15 and enabling the decoder 290 with the signal VMA, the microprocessor 236 will cause the decoder 290 to produce a low logic level on one of its four output lines Y0-Y3. Two of these lines are used to differentiate between different classes of peripheral devices which communicate with the microprocessor 236. The output line Y1 is used to enable a second decoder 292 by its connection to the enable input *G1 of the device, while the Y3 output of decoder 290 is used to enable the EPROM 240. When the microprocessor 236 is selecting peripheral devices other than the EPROM 236, the Y1 output of the decoder 290 is a low logic level along with the address line A12 connected to the *G2 input of the decoder 292. In addition, a high logic level on the address line A13 connected to the enable input G is used. Address lines A9-A11 of the microprocessor are connected to the decoding inputs A, B and C of the decoder 292. When the decoder 292 is enabled, the bit combinations on address lines A9-A11 cause one of the outputs Y0-Y7 to make a transition to a low logic level. These outputs Y0-Y7 become the select signals S1-S8 which are distributed to and enable the peripheral devices which communicate with the microprocessor 236 as described hereinbefore.

FIG. 11 will now be more fully described to disclose the detailed electrical schematics of the system control 14 and the serial data communications processor 15. The system control 14 is a microprocessor based control having a control microprocessor 202, electrically programmable read only memories (EPROM) 208, 210 and a random access memory (RAM) 216. The EPROMS 208, 210 contain the system control program and the RAM 216 handles data calculations and acts as a scratch pad for variables. The location in the memories 208, 210 and 216 which the microprocessor 202 addresses is determined by connecting the address inputs of the memories to the output of a address bus buffer 204. The address bus buffer receives address signals from the microprocessor 202 at address outputs A0-A15, buffers the signals and produces similar address signals, from its outputs Y0-Y15 on a microprocessor address bus 205. In this manner, instructions from locations in the EPROM 208 can be selected by signals on address lines A0-A12, instructions from locations in the EPROM 210 can be selected by signals on address lines A0-A12, and data in RAM 216 can be selected by signals on address lines A0-A10. Each of the memories 208, 210 and 216 is connected by its data inputs D0-D7 to the microprocessor data bus 217 which communicates bidirectional 8-bit data words to and from the microprocessor data ports D0-D7. Instructions may be read out of the EPROMS 208 and 210 by placing the address location desired on the address bus A0-A15, enabling the respective memory, and reading the data on the microprocessor data bus 217. In similar manner data may be stored in or read from the RAM 216 by selecting an address on the address bus A0-A15, enabling the memory, and either reading the data from the microprocessor data bus 217 or writing it to the data bus 217.

The microprocessor 202 further reads data from and supplies data to other address locations of its memory map 228 by connecting peripheral devices to the data bus and address selection circuitry. For example, the microprocessor 202 can store information in external registers of a display 212 by means of the microprocessor data bus 217. The input switches 24 may be read through external registers onto the data bus 217. Further, information may be communicated to or derived from the videotape recorder through the VTR port 72 which is also connected to the data bus 217.

The system function registers are further accessed in a similar manner. The microprocessor data bus 217 is extended to become the system data bus 16 through the bus buffer 17. The bus buffer 17 receives the microprocessor data bus 217 at its bidirectional ports D0-D7 and extends the bus from its bidirectional ports Y0-Y7. The buffer 17 is enabled by signal E from memory map means 228, and the direction data flow is controlled by the logic level applied to its DIR input. The enabling signal to the bus buffer 17 is a memory mapped selection signal developed by the memory map means 228.

The memory map means 228 decodes the signals on the microprocessor address bus 205 to provide a number of selection signals. From the address signals A0-A15, the memory map 228 develops microprocessor selection signals S0-S15 on the select bus 28 to enable the memories 208, 210, 216, the display 212, the input switches 24, the VTR port 22, and a FIFO buffer 206 which interfaces with, and may be considered a part of, the serial data communications processor 15 (FIG. 6). The address signals A0-A3 are used as the system address bus 18 to select particular registers of a system function register set. The selection signals EC1-EC17 form the system select bus 20 which selects the particular functional module or the set of system function registers chosen by the system address bus 18. Because all of the devices accessed by the microprocessor 202 are external to the chip itself, the valid memory address signal VMA, output from an identically labeled pin and inverted by an inverter 222 is used to enable the memory map means 228. Further, for timing purposes the external memory clock E from the microprocessor 202 is extended to the memory map means 228 and further to the system function register sets via an inverter 226.

The direction of data flow between the control microprocessor 202, the FIFO device 206, and RAM 216 is controlled by a read/write control 224. The enable clock E is provided to the R/W control and the read/write signal R/*W output from the microprocessor 202 is extended to the R/*W input of the read/write control 224. Further, the system clock signal SYSCLK provides an overall basic synchronization for the read/write control with the microprocessor 202 memory cycle.

An interrupt control 200 provides means for transferring control from the regular system routines, which will later be termed the background, to an interrupt servicing routine where specialized functions can be processed on a basis synchronous with an interrupting signal. The interrupt control receives two such interrupts, where one is a interrupt request IRQ FIF1 from the FIFO 206. This signal indicates to the microprocessor 202 that the FIFO buffer has a message or contains information which should be transferred to the system. The second interrupt is a signal REF V/2 which is derived from the reference clock 114 (FIG. 3). The REF V/2 signal is the vertical reference synchronization pulse at one half the frequency. The edges of the reference signal are used to determine even and odd fields where if an edge produces a 0 to 1 transition it is an even field, and if the edge produces a 0 to 1 transition, it is an odd field. If either of these interrupts occur, then the interrupt control 200 signals the microprocessor 202 by applying a pulse to its *IRQ input. This produces a transfer of program control to an interrupt trap location where a vector to an interrupt servicing routine is stored. The interrupt servicing routine can then interrogate the interrupt control 200 via the data bus 217 to determine which interrupt has occurred. Depending upon the result of this test, the microprocessor 202 handles the interrupts under program control and thereafter transfers or continues the program to background processing.

Figure 12:
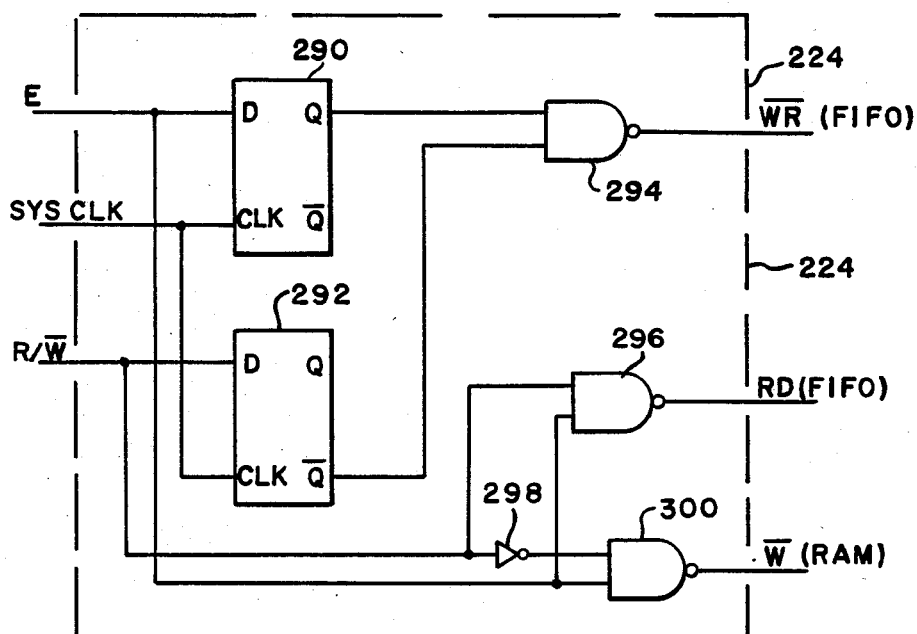
FIG. 12 is a detailed electrical schematic of the interrupt control of the system control illustrated in FIG. 11.

FIG. 12 will now be discussed to illustrate the detailed electrical schematic for the read/write control 224 of the system control 14. The read/write control 224 of the system control receives the signals SYS CLK, R/*W, and E from the microprocessor 202. The SYS CLK signal is the system clock and is applied to the CLK inputs of two D-type bistables 290 and 292, respectively. The R/*W signal from the read/write control line of the microprocessor 202 is applied to the D input of the bistable 292, one input of a NAND gate 296, and one input of a NAND gate 300 through inverter 298. The external clock signal E is applied to the D input of the bistable 290 and to the other inputs of the NAND gates 296, 300, respectively. The Q output of the bistable 290 and the *Q output of the bistable 292 are applied to the inputs of a NAND gate 294. The output of the NAND gate 294 generates the write signal *WR for the FIFO and NAND gate 296 generates the read signal RD for the FIFO. The output of the NAND gate 300 generates the write signal *W for the RAM 216.

When the R/*W signal is a high logic level and coincides with a high logic level of the signal E, the NAND gate 296 generates the signal RD as a low logic level. Alternatively, when the R/*W signal is a low logic level and the signal E is a high logic level, these levels are clocked into the bistables 290 and 292 by the falling edge of the system clock signal SYS CLK. A high logic level input to bistable 290 sets the device and a low logic level input to bistable 292 resets that device. These signals thus enable NAND gate 294 to generate a signal *WR which is a low logic level. Further, in response to a low logic level of the R/*W signal and the coincidence of a high logic level of the signal E, the NAND gate 300 will generate the signal *W, which is a low logic level. The generation of the *WR signal is synchronous or clocked by the system clock signal SYS CLK to produce a signal with negative going edge coincident with the presence of stable write data at the FIFO data bus terminals. The RD signal and the *W signal are separated by being enabled by alternate logic levels of the R/*W signal.

Figure 13:
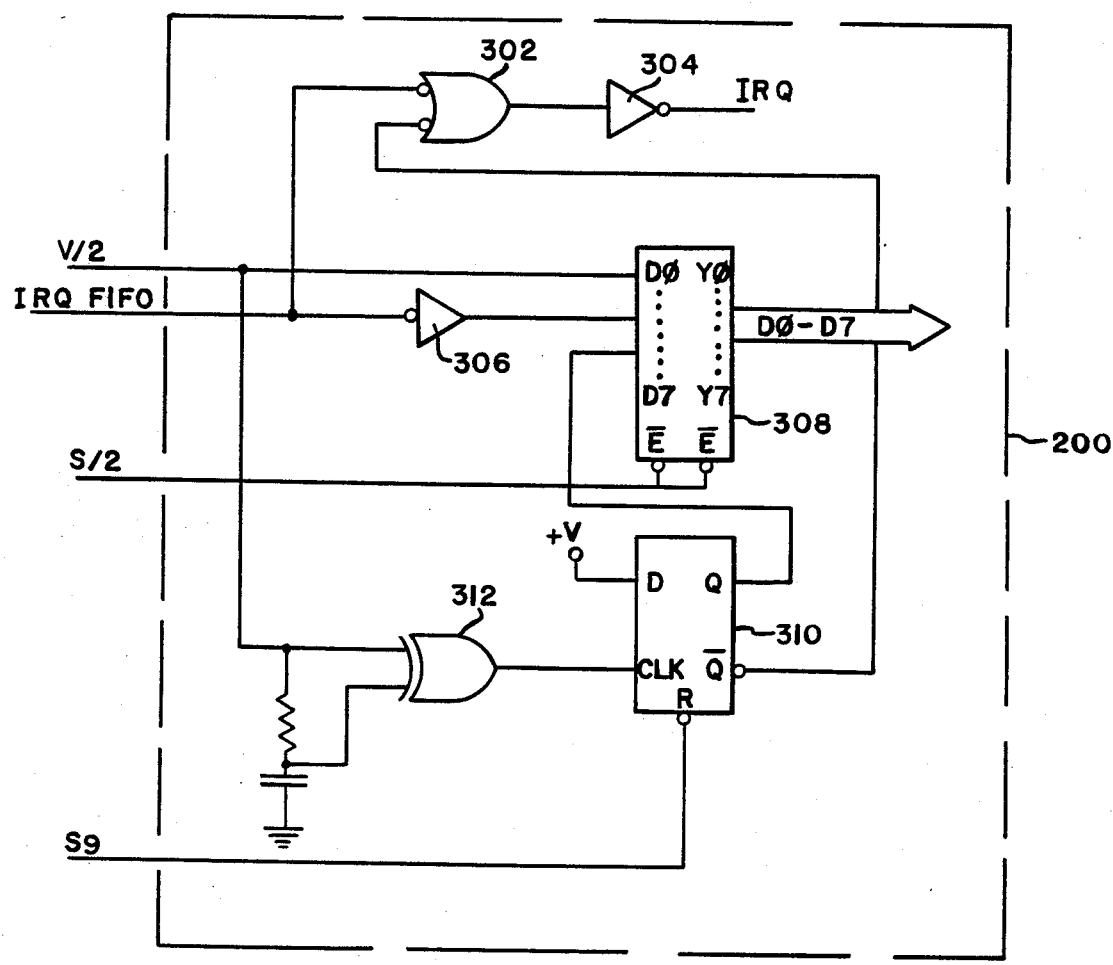
FIG. 13 is a detailed electrical schematic of the read/write control of the system control illustrated in FIG. 11.

With respect now to FIG. 13, a detailed schematic of the interrupt control 200 will now be more fully described. The interrupt control 200 comprises an interrupt decoding circuit including a two input NOR gate 302 and an inverter 304. The circuit further includes a buffer 308, a D type bistable 310, and a pulse forming means which uses exclusive OR gate 312. The interrupt request IRQ FIFO and *Q output at the bistable 310 are input to the NOR gate 302 to provide a low logic level signal at the output of the inverter 304 when either of those signals are a low logic level. A low logic level on the output of the inverter 304 grounds the IRQ input of the microprocessor 202. Thus, when either of these request signals are present, an interrupt is recognized by the microprocessor 202 and control is transferred to a special interrupt service routine.

After a transfer of control to the interrupt service routine, the microprocessor 202 will produce a low logic level on the select line S12 output from the memory map 228. The select signal S12 will enable the buffer 308 to pass the interrupt request signals from its D0-D7 inputs to its Y0-Y7 outputs. The outputs of the buffer 308 are connected to the microprocessor data bus 19 and provide a means for reading the interrupt requests into the memory of the microprocessor 202. The data word read into the memory of the microprocessor 202 will have stored the interrupt request as a low bit value in a particular position. From this bit position, the microprocessor 202 can make decisions to determine the program data path from that point.

Further, connected to the data input D3 is the output of bistable 310. The bistable 310 is clocked by a pulse at the vertical rate from the pulse forming means to indicate the edge of the V/2 reference signal is present. This bit can also be read into the memory of the microprocessor 202 by strobing the buffer 308 with the select signal S12. The information bit is stored in the bistable 310 until that device is reset by the microprocessor 202 by generating a reset signal to the bistable with select signal S9.

Figure 14:
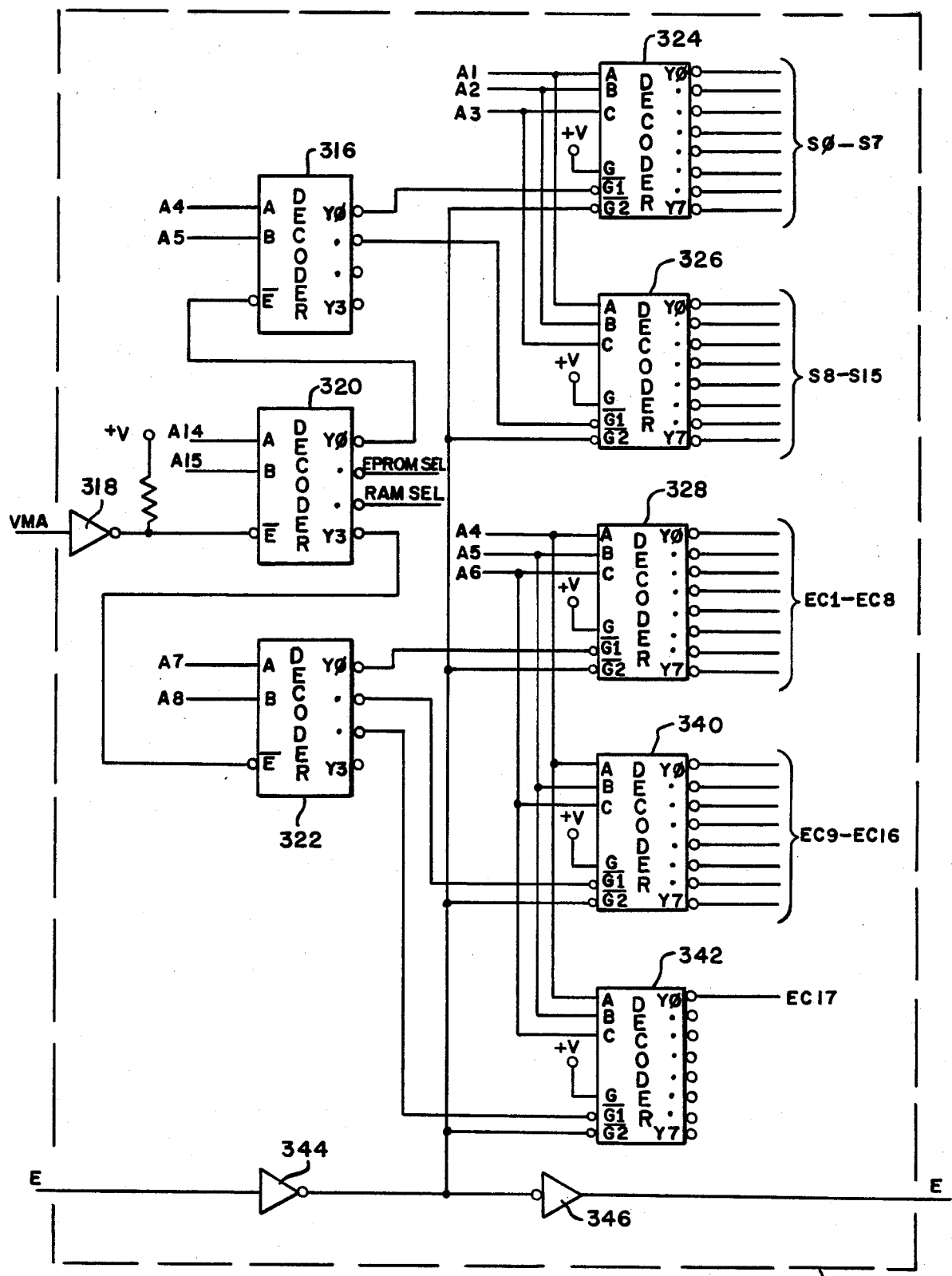
FIG. 14 is a detailed electrical schematic of the memory map of the system control illustrated in FIG. 11.

The memory map 228 is more fully illustrated in the detailed electrical schematic forming FIG. 14. The memory mapping means 228 comprises seven decoders 316, 320, 322, 324, 326, 328, 340 and 342, respectively. The decoders receive address lines A0-A15 and generate select signals S0-S15, EC1-EC17, EPROM SEL, and RAM SEL by decoding the address signals. Timing for the decoding is supplied by the valid memory address signal VMA input through inverter 310 to the enable input *E of the decoder 320 and the external clock signal E input through inverter 344 to the enable *G2 inputs of decoders 324, 326, 328, 340, and 342. The master decoder 320 decodes address lines A14, A15 applied to its decoding inputs A, B into four select signals output from its Y0-Y3 terminals. The first select signal from the output YO of the decoder 320 enables decoder 316 to provide a selection for the S0-S15 signals. The second select signal output from the Y1 output of decoder 320 provides a selection signal for the EPROM memory. The third selection signal output from the Y2 output of decoder 320 provides a selection of the RAM memory 216. The fourth selection signal output from the Y3 output of decoder 320 provides an enabling signal to decoder 322 thereby providing a selection for the EC1-EC17 signals. Thus, these four select signals choose four separate portions of memory where the first chooses the peripherial devices, the second chooses the EPROM memory, the third chooses the RAM memory, and the fourth chooses the system function registers.

Selection between peripherial devices is determined by the address lines A4, A5 input to the decoding inputs A, B of decoder 316. The YO output of decoder 316 enables decoder 324 to choose one of eight selection signals S0-S7 by enabling the *G1 input of the device. The Y1 output of decoder 316 enables the *G1 input of decoder 326 enabling that device to select one of eight signals S8-S15. The particular select signal generated is dependent upon the bit combination of address lines A1-A3 input to the decoding inputs A, B, C of the decoders 324, 326, respectively. Similarly, the decoder 322 decodes the address lines A7 and A8 by its decoding inputs A, B to generate an enabling signal either to decoder 328, 340, or 342. The YO output enables the *G1 input of decoder 328, the Y1 output enables the *G1 input of decoder 340 and the Y2 output enables the *G1 input of decoder 342. The selection of the output from decoder 328, 340, and 342 is thereafter determined by the bit combination on address lines A4-A6 which are input to the decoding inputs A, B, C of the devices. The EC1-EC17 signals are used to select the particular group of system function registers and thus the particular system function module for communication with the microprocessor 202.

Figure 15:
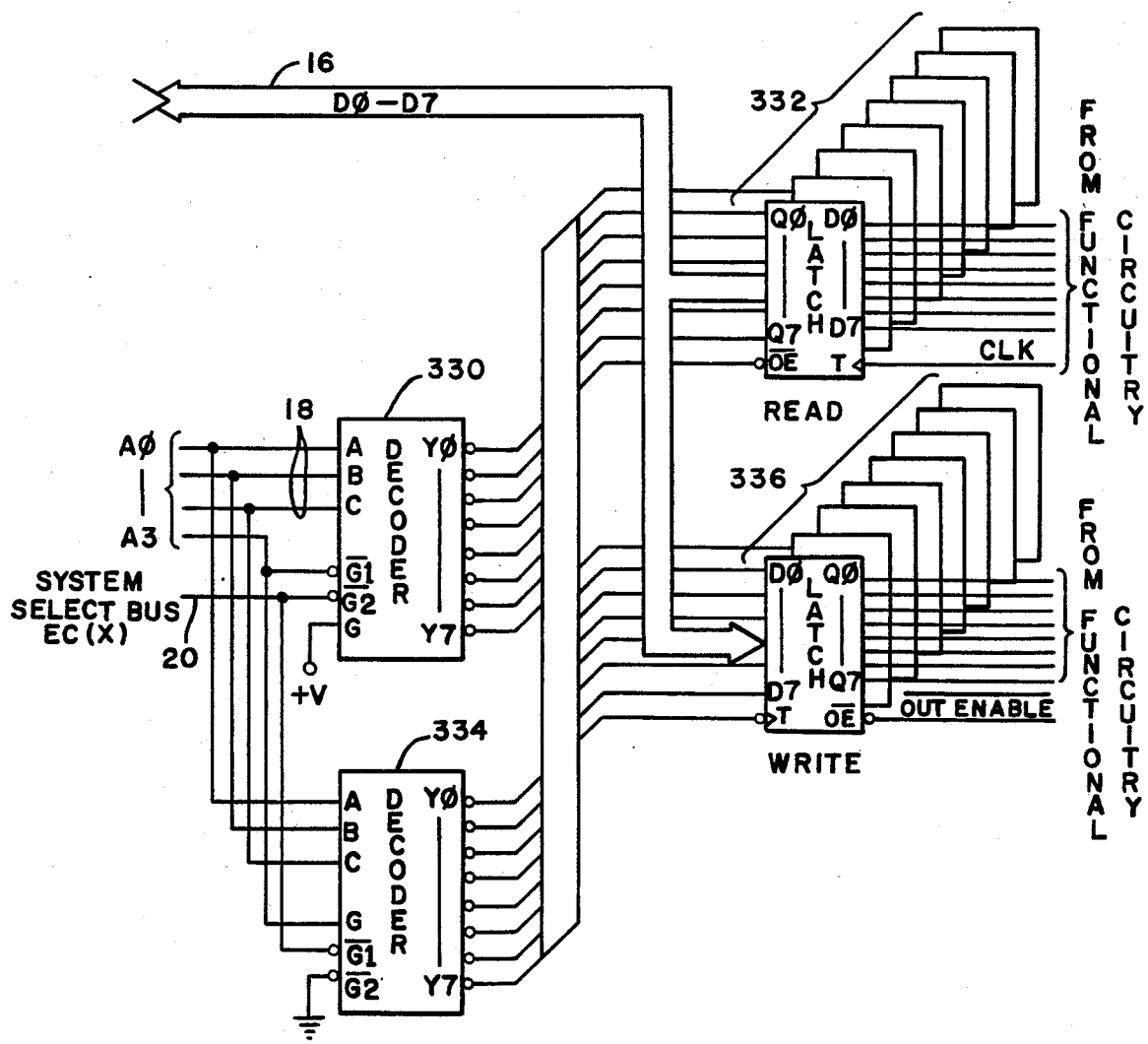
FIG. 15 is a detailed electrical schematic of one implementation of a set of system function registers for a particular system function module of the time base corrector illustrated in FIG. 2.

The detailed electrical schematic for one implementation of the system function registers is illustrated in FIG. 15. This implementation is shown for one system function module, and each module of a time base corrector would have similar circuitry. The system function registers are preferably divided into a set of read only registers 332 and set of write only registers 336. The write only registers can be written into with data on the system data bus such that control bits recognized by the function circuitry will enable or disable particular operations of the module. The read only registers 332 provide a means for storing information concerning the modes, status, and values of operational parameters of the function circuitry of the module. The read only registers 332 can be interrogated over the system data bus to deliver this information to the system control.

The write only registers 336 comprise a plurality of control latches having their D0–D7 inputs connected in parallel to similarly labeled data lines of the system data bus. The total number of read only registers and write only registers per single function module may reach 16. It is evident that there is no necessity that they be divided evenly between read-only and write-only registers. A parallel data word on the system data bus 16 is steered or directed to the desired control latch by a low logic level on one of the outputs Y0–Y7 of a multiplexer 334. Clock input T of each write-only latch 336 is connected to a corresponding output Y0–Y7 of one of the decoders 330, 334. The particular latch receiving data is determined by which output Y0–Y7 of the decoders 330, 334 is selected after decoding bit combinations at the inputs A, B and C of the devices. The system address bus 18 lines A0–A2 are connected to these decoding inputs and supply the bit combinations for the selection process. The unused enable input *G2 is grounded for the decoder 334. The outputs of the control latches may be always enabled to the function circuitry by having their output enable inputs *OE grounded.

The read only registers 332 comprise data latches which are reversed from the connections of the control registers. Data is clocked into the latch from the function circuitry through the D0–D7 inputs of each latch. A separate clock or control line to the clock input T of each register is supplied by the function circuitry and can be loaded in a predetermined or hard wired sequence or even in a programmed sequence. For example, if the function module contains a microprocessor, a configuration for writing into the data registers 332 similar to that described previously for the control registers could be used. Once the information is in the data latches 332, each can be separately interrogated by the individual strobes of their output enable inputs *OE by corresponding outputs of a multiplexer 330. The Q0–Q7 outputs of the latches 332 are connected in parallel to the data lines D0–D7 of the system data bus 16. Thus, when the corresponding output of one of the decoders 330, 334 produces a low logic level, the data from the data latch whose output is enabled, is transferred on the system data bus 16 such that the system control microprocessor 202 can read the data into memory. The decoders 330, 334 have one of their outputs selected by decoding the bit combinations of address lines A0–A3 of the system address bus 18 presented at their decoding inputs A, B and C. The multiplexer is enabled by having a low logic level applied to its *G1 input from the A3 address line. The enable input *G2 of the multiplexer 330 is enabled by its connection to the EC(x) line of the system select bus 20. The unused enable input G of the multiplexer 330 is connected to a source of positive voltage +V.

Thus, the address lines A0–A3 select one of the 16 registers 332 and 336. The select line EC(x) selects the particular system function module and the module function register set for operation. While an advantageous implementation of the function registers for memory mapping a system function module into the memory space of a system control of a TBC has been shown, other implementations are readily evident. For example, more or fewer registers could be supplied for each system function module, or only read only registers or write only register 0 up to the 16 register total supplied. Alternatively, it is evident that by using the bus system including system data bus, address bus, and system select bus, an alternative configuration using bidirectional read/write registers could be readily implemented. The specific configuration of the system function registers for each function module will depend upon the number of operations that need to be controlled by the control registers and the information that the system control must request from the data registers.

Figure 16:
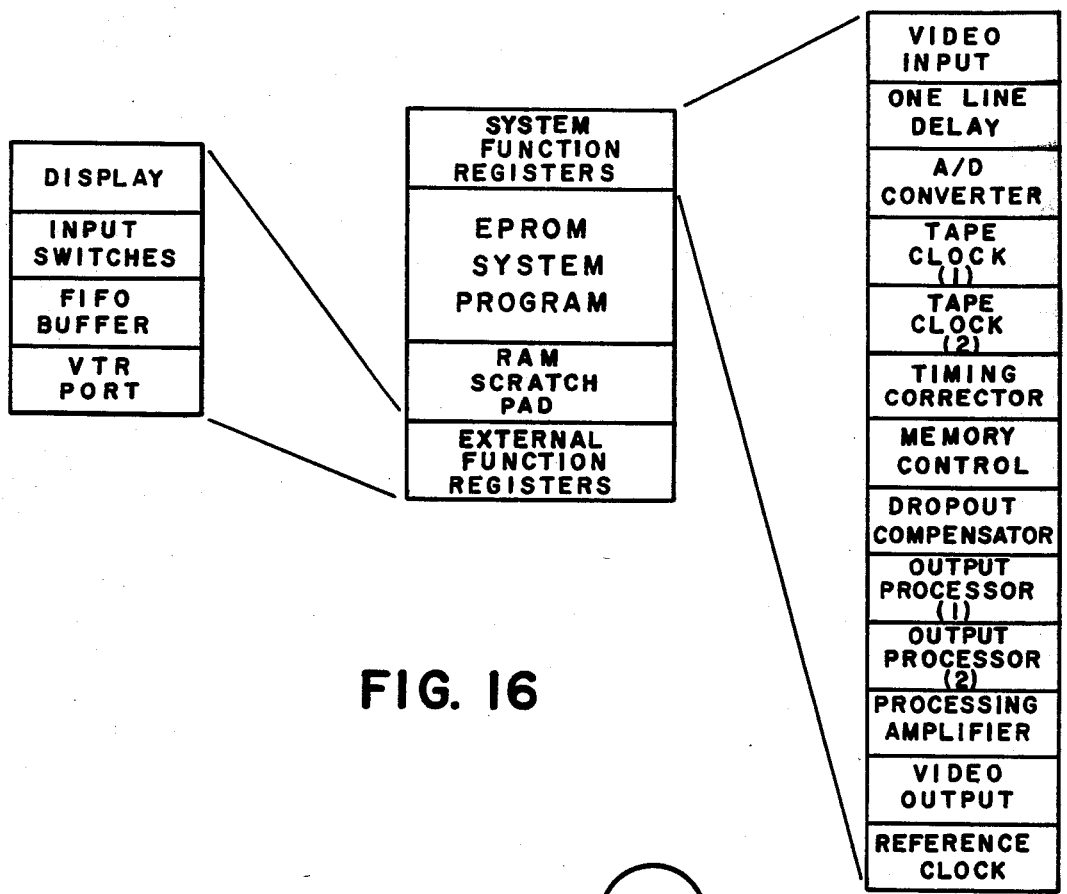
FIG. 16 is a pictorial representation of the assignment of memory space for the system function registers, external function registers, EPROM and RAM memories of the system control illustrated in FIG. 11.

FIG. 16 illustrates a system memory map for the system control processor 202. The system memory map includes memory space for the EPROMS 208 and 210 storing the system program, a RAM scratch pad 216 and two sets of function registers. As previously indicated, the system function registers are contained in the system function modules for each particular operation and include memory space for the video input module 100, the one line delay module 124, the A/D converter module 102, the tape clock module 108, the timing corrector module 104, the memory control module 110, the dropout compensator module 126, the output processor module 112, the processing amplifier module 118, the video output module 120, and the reference clock module 114.

It is noted that if any particular function modules include more hardware circuitry than can conveniently be adapted to a particular size of printed circuit board, or number of communication lines, then the modules can be broken into submodules. Particularly, it is illustrated in the preferred implementation of memory space that the tape clock module 108 and output processor module 112 are divided in such manner. Because the modules 108, 112 for the tape clock and output processor are physically distinct, the memory space allocates a set of system function registers for each submodule. This permits data to be transferred through the system control between submodules and even assists in the division of the circuitry. The system memory space also includes function registers for the external or peripheral functions. Particularly, the display 212 includes registers which can be written into to produce the needed informational displays. Further, there are external registers which allow the system control to read the input switches and include read only registers. A bidirectional set of registers to service the FIFO circuit 206 which transfers information to and from the serial communications processor 15 is also mapped into the memory space. Finally, there are the external function registers which service the VTR port 22, allowing correct real time digital command data to be supplied from the videotape recorder 10 to the time base corrector.

Figure 17:
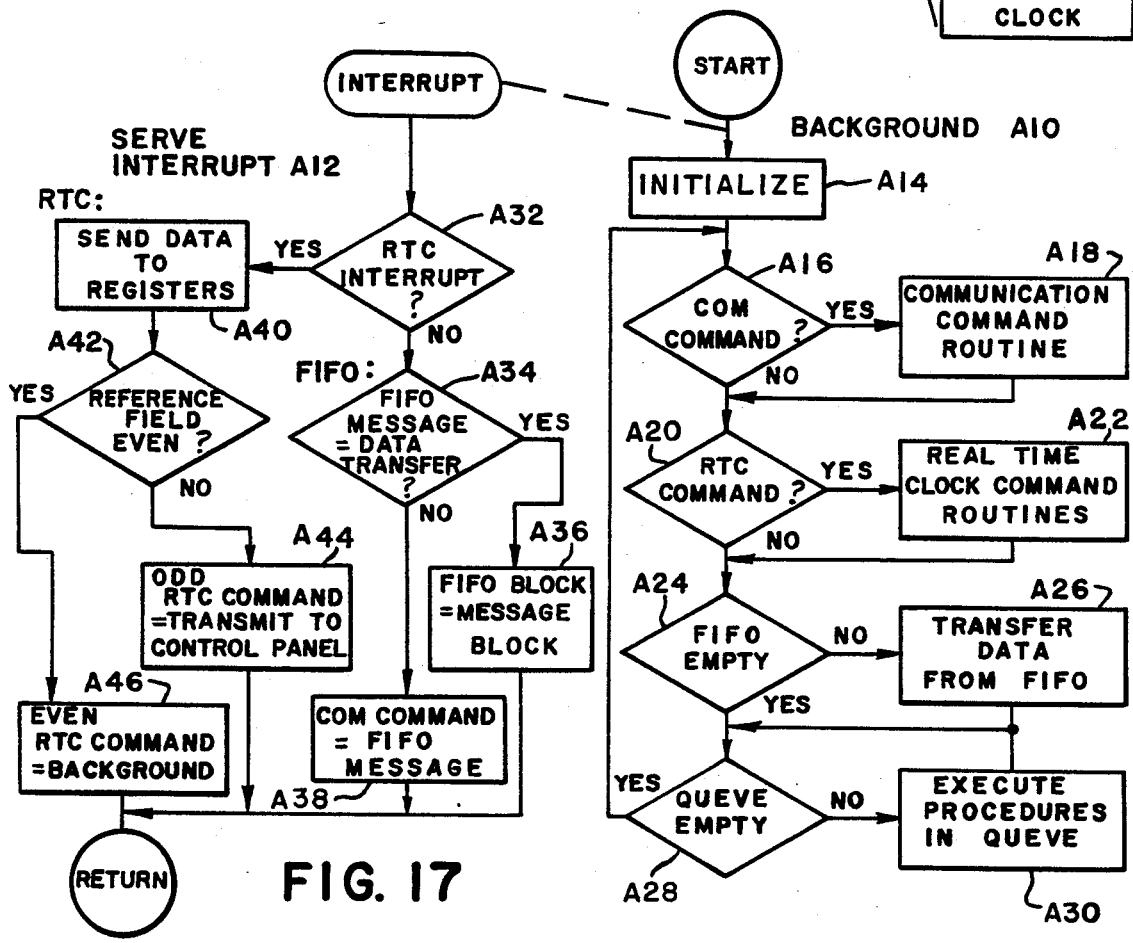
FIG. 17 is a system flow chart of the system program stored in the EPROMS of the system control illustrated in FIG. 11.
Figure 18A:
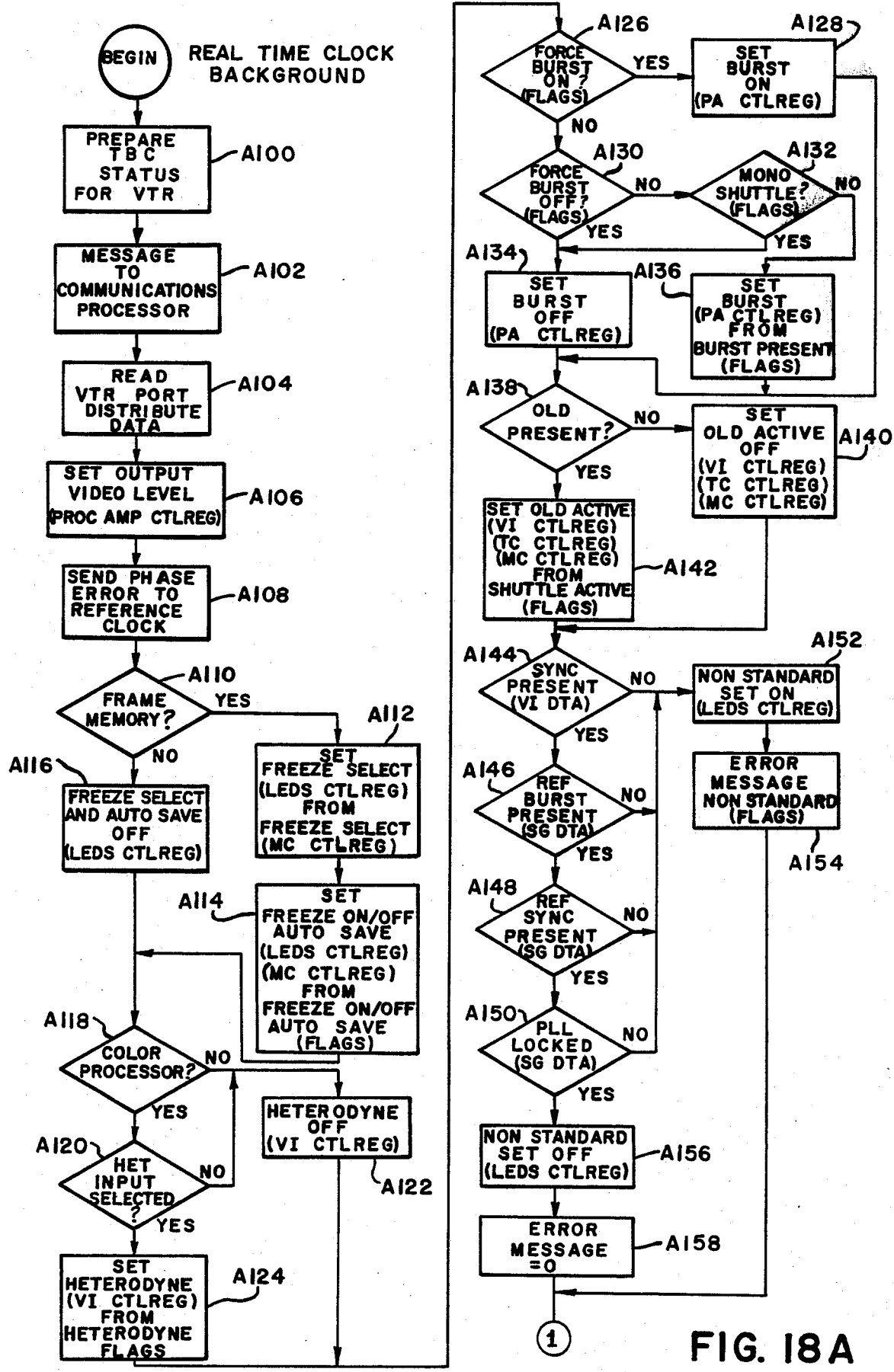
FIGS. 18A-G are a detailed flow chart of the real time clock background routines executed as a subroutine of the system program illustrated in FIG. 17.
Figure 18B:
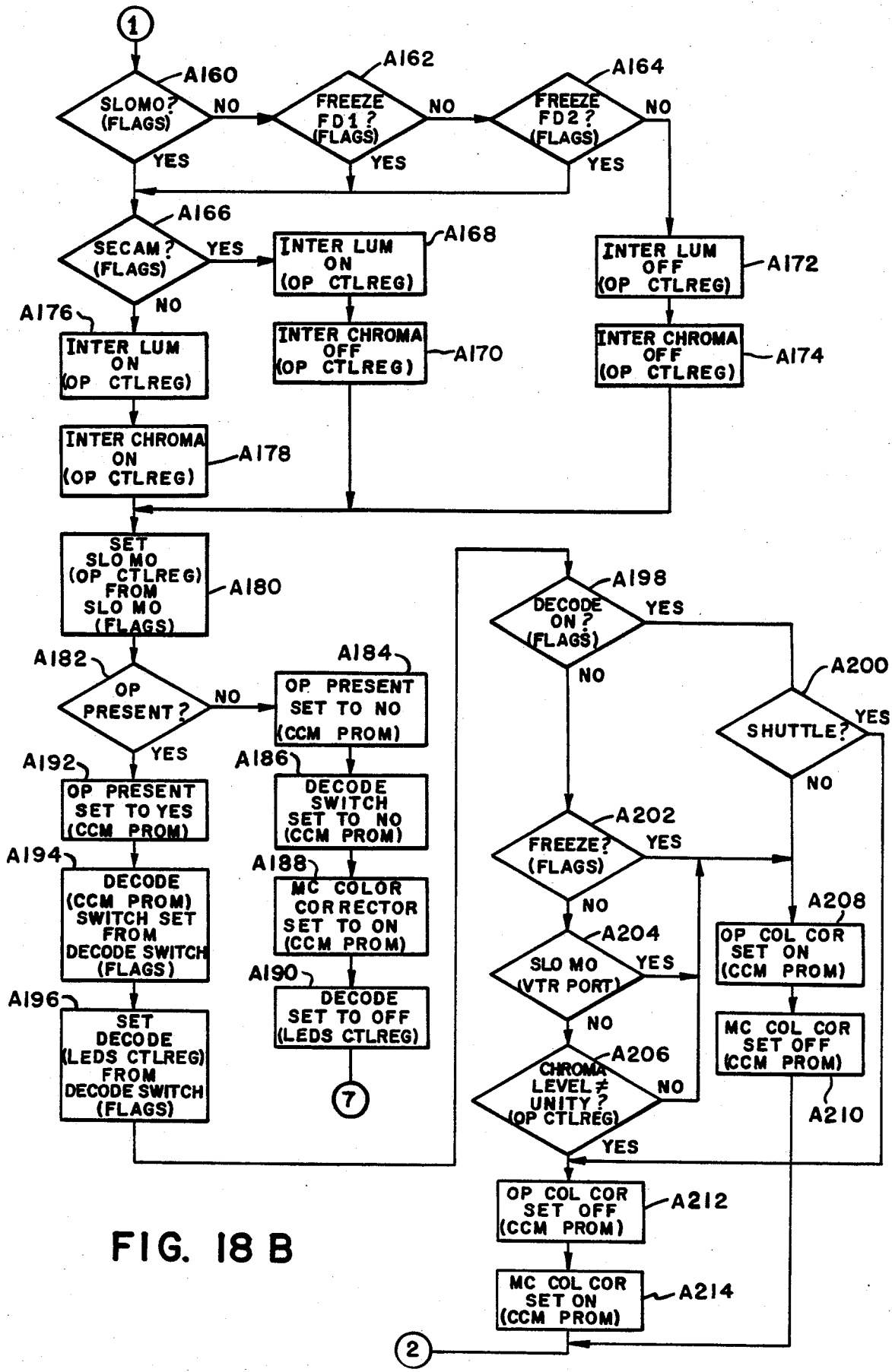
Figure 18C:
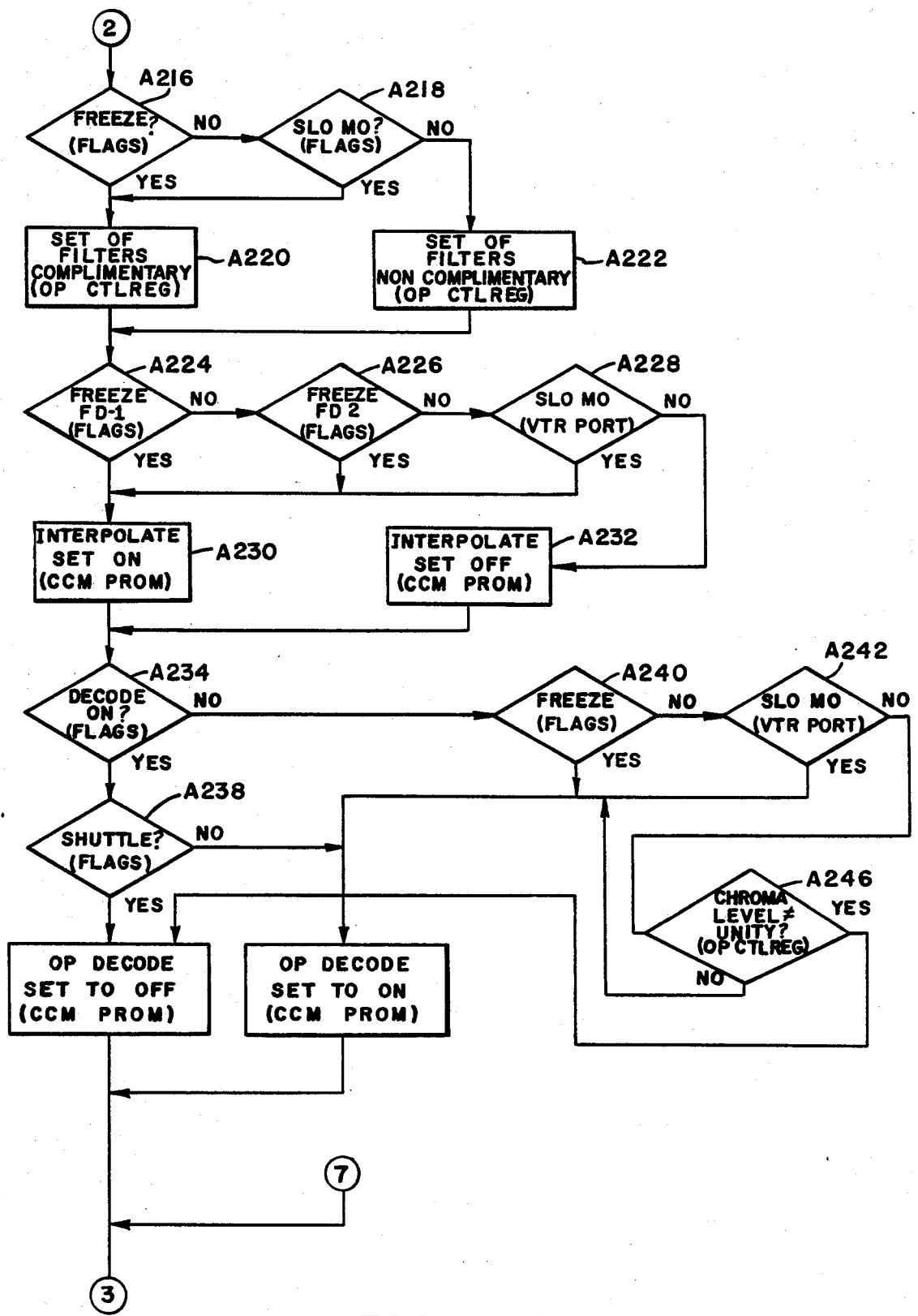
Figure 18D:
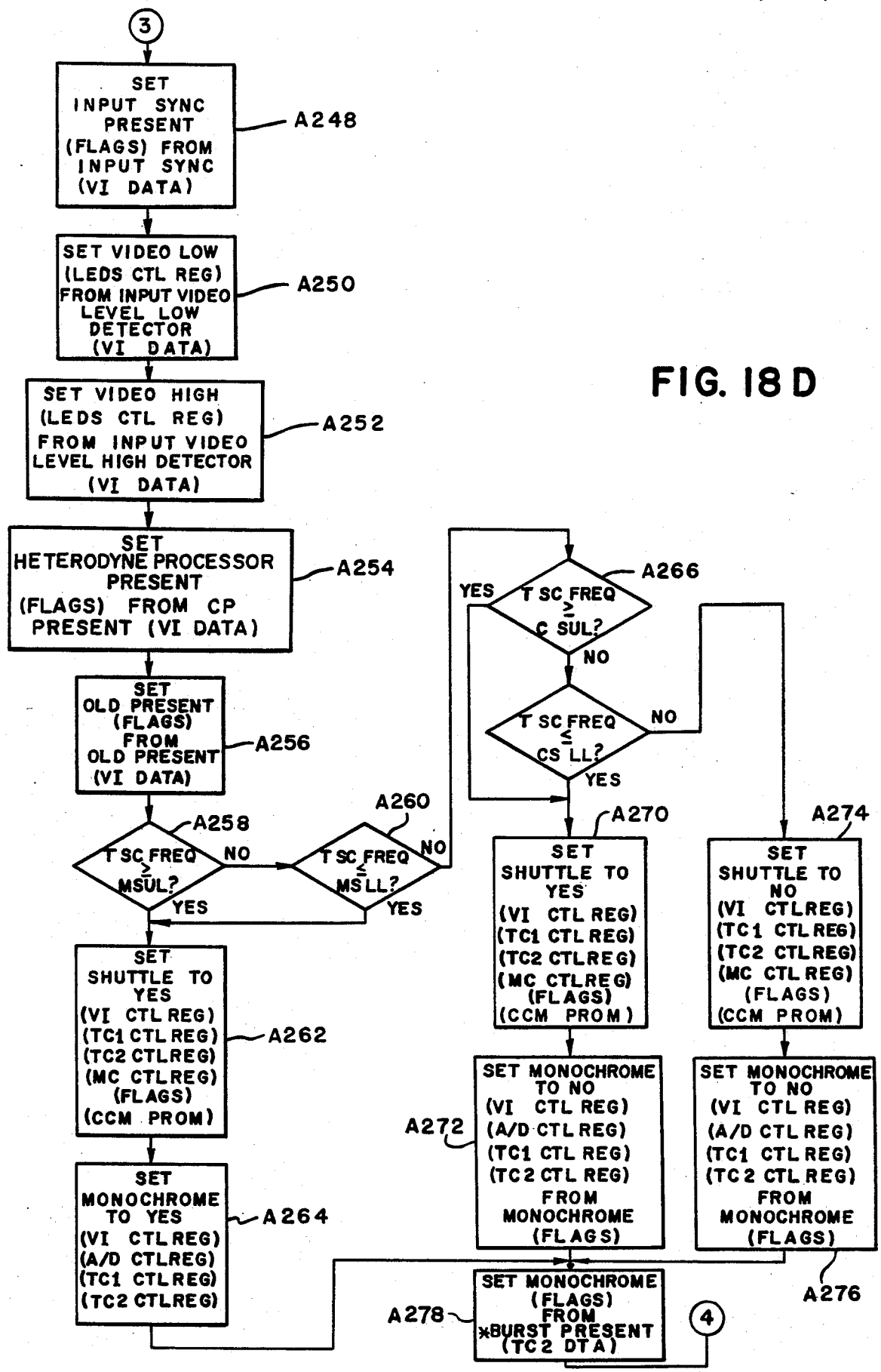
Figure 18:
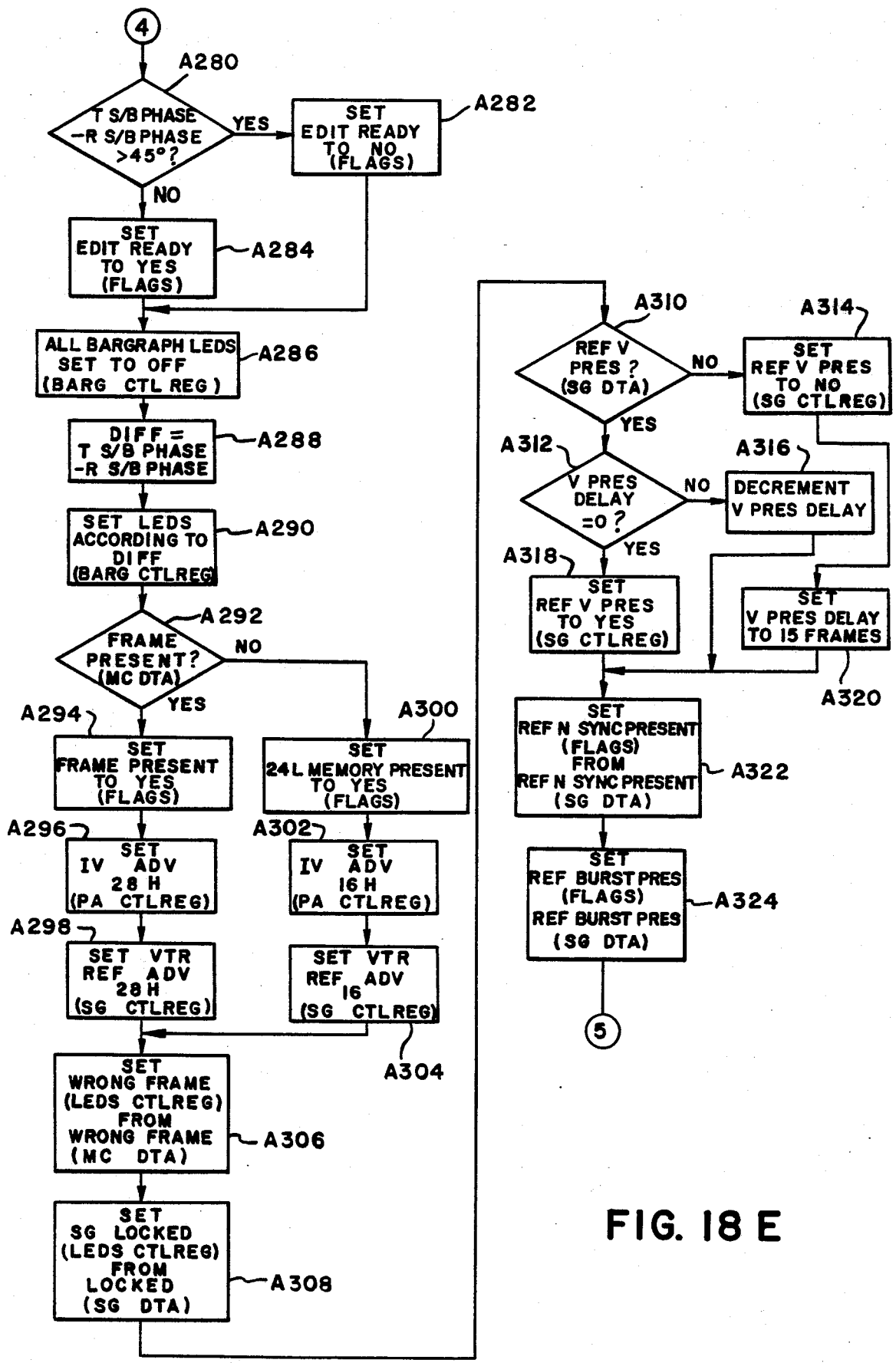
Figure 18:
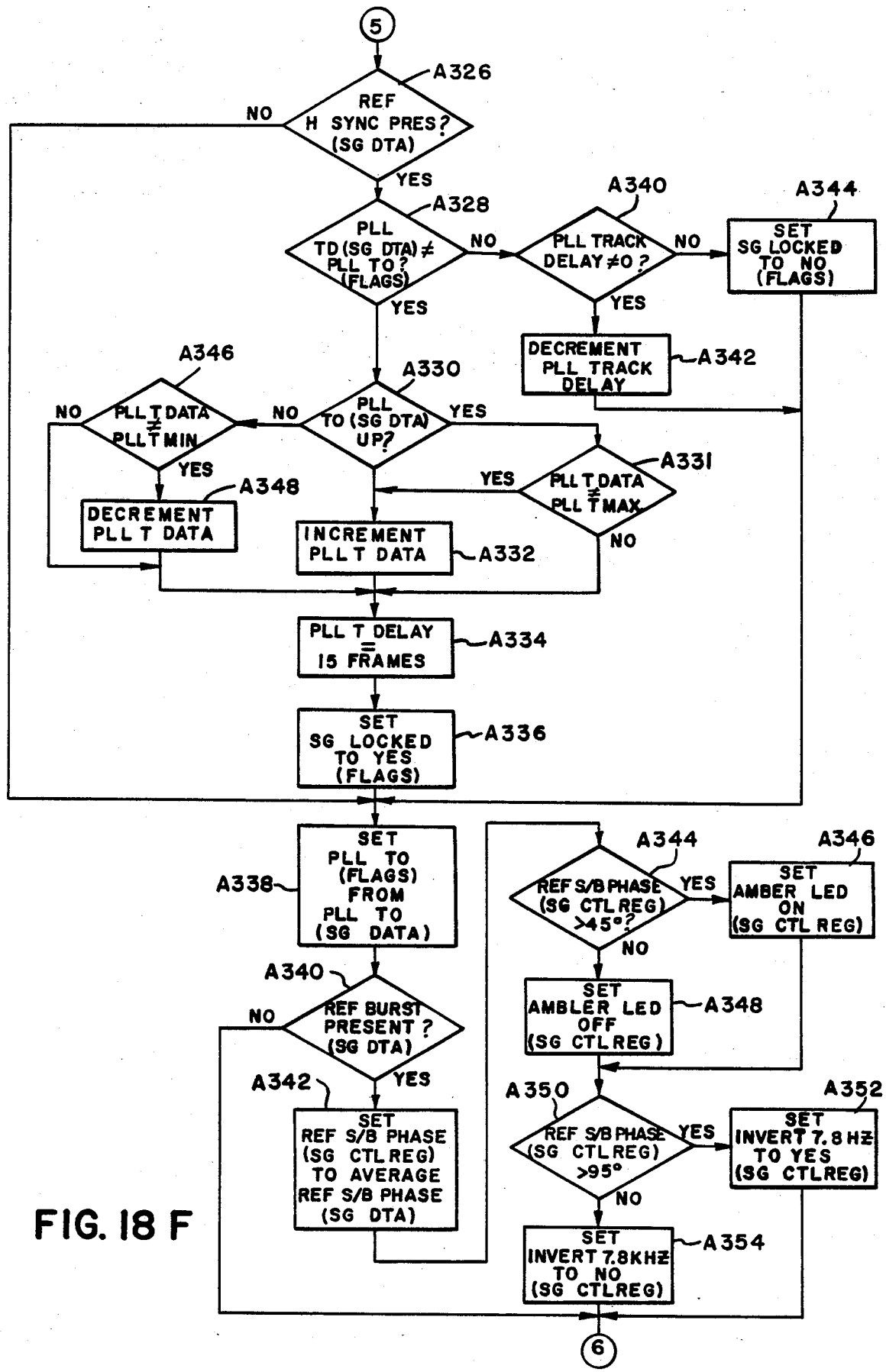
Figure 18:
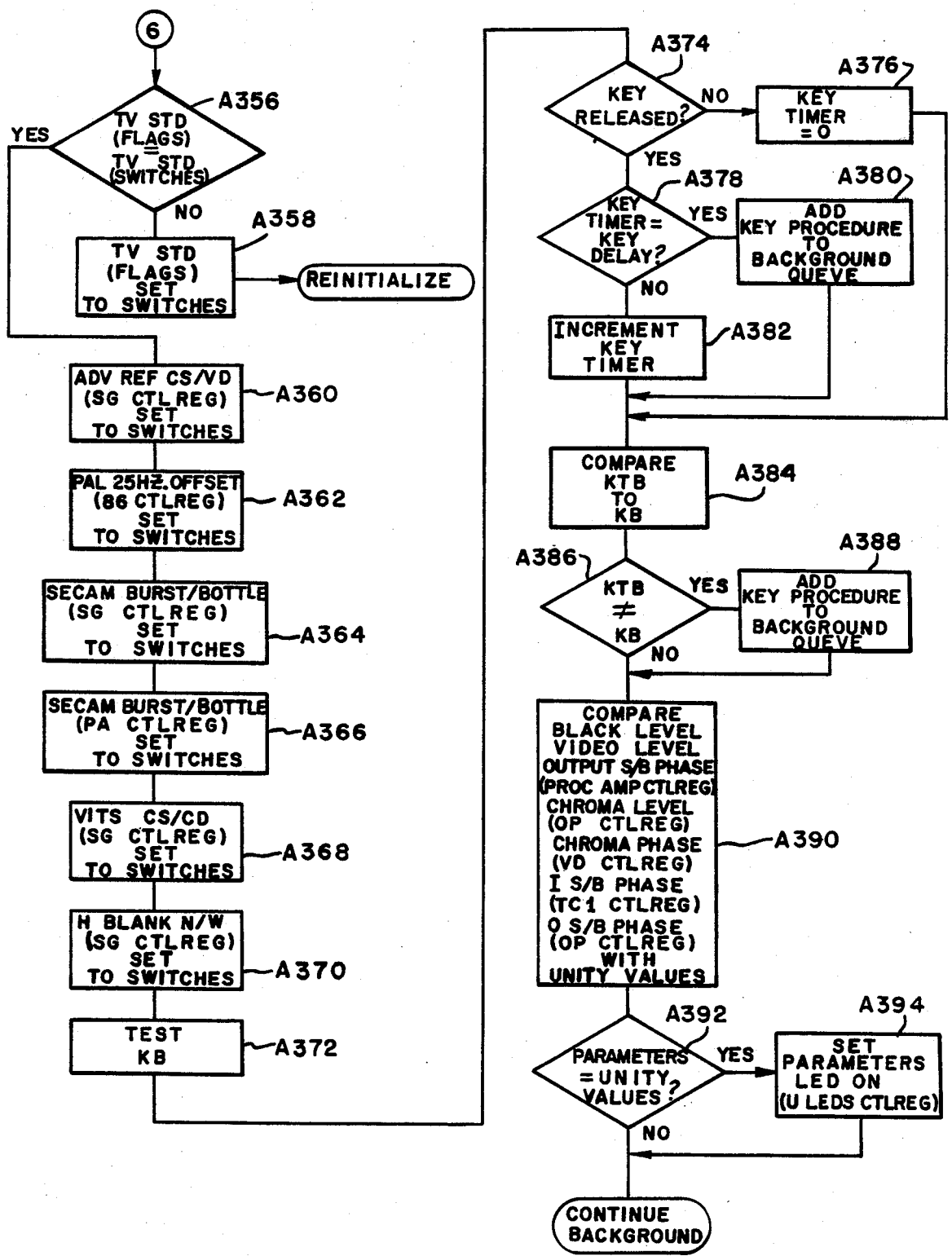

FIG. 17 is a system flow chart of the program contained in the EPROMS 208 and 210 which regulate the operation and communications of the control processor 202. The system program is divided into a background section A10 and a interrupt service routine A12. In general, the background program executes commands and background operations in a specific sequence determined by the interrupt routine A12. The background routine A10 begins with an initialization block A14.

The initialization routine in block A14 begins by setting a number of reference parameters to their initial values and by testing the EPROMS and RAMS for errors before starting the program. Further, the initialization routine contains a reinitialization subprogram where, if previous data were lost during a power down, these values are reinitialized. The TV standards determined for the time base corrector by the switches are read and cause different operations to take place depending upon the standard for the signal being corrected. The initialization routine also checks for the presence of the optional boards of the TBC to determine the configuration of the actual system. The one line delay function module 124 is checked, and information about the inclusion or bypassing of that function in the video signal path is generated for the memory control module 110. Further, the main memory size is determined, and information about that function is developed for the processing amplifier module 118 and the reference clock module 114. In addition, the output processor 112 is interrogated to determine whether it is present or absent, and information about that module is prepared for the memory control module 110. Further, the dropout compensator module 126 is interrogated to determine if it is present. The memory control module 110 needs information concerning its presence or absence and such is prepared by the routine.

After initialization, the main background loop A10 begins a series of tests to determine whether a command is present and which type of command the routine should execute. In block A16 the program tests for a communication command and, upon finding a valid communication command, will transfer control to block A18 where that operation is executed. If no communication command is present, then a real time command is checked for in block A20. If there is a real time command present, then control is transferred to the real time clock command routines in block A22 which executes those commands. If, however, there are no communication commands or real time commands, the program steps to block A24 where a test is executed to determine if the FIFO buffer 206 is empty. If the FIFO buffer 206 is not empty, then control is transferred to a data transfer handling routine in block A26 which transfers data from that device.

However, if there are no commands to execute and the FIFO buffer 206 is empty, then the program tests in block A28 to determine if any background programs are in a queue. If the queue is not empty, then the program will execute one of the procedures in the queue by transferring control to block A30. Thereafter, the program loops between block A28 and A30 until the queue is finally empty. Once the queue is empty, then the program can return to the start of the loop where it again looks for commands or the FIFO buffer needing data transfer.

During this background program execution, an interrupt may occur from either the real time clock interrupt, which is the transition of the reference V/2 signal or the FIFO interrupt. Block A32 determines which interrupt is present and transfers control to one path beginning with block A40 for the real time clock interrupt or transfers control to path beginning with block A34 for the FIFO interrupt.

The path for the real time clock interrupt begins with the block A40 by sending data which are prepared for the system function registers and external function registers to those memory locations. Because the real time clock interrupt occurs with a predetermined periodicity, the registers are updated once every time interval to provide accurate and current information for the control of system function modules. Next in block A42, the program determines from the edge of the reference V/2 signal whether the field of the present frame is even or odd. If the field is even then control is transferred to block A46 where the real time command is set to a background command, while if the field is odd, the real time command is set to a command for transmission to the control panel in block A44. In this manner, the system will execute the real time clock command background routines during the even fields and will execute transmissions to the serial communication processor during the odd fields. This separation between communications and background processing allows the system flexibility in maintaining communications while still providing enough time to process the background routines.

Alternatively, if the control path was transferred to block A34 where the FIFO interrupt was detected, then the message register in the FIFO is decoded to determine whether a data transfer is to take decoded to place. If the answer to this test is affirmative, then in block A36 the FIFO block length for the background routine is set equivalent to the number delivered from the FIFO message block of that device. If, however, the FIFO message register did not contain a data transfer command, then the communication command variable is set equal to whatever command was present in the FIFO message register in block A38. Both paths of the interrupt routine converge at this point to return to the background program and permit further processing of the background routines.

FIGS. 18A–G illustrate a detailed flow chart of the real time clock background routines. The real time clock background routines are executed on even fields by the background loop upon decoding the real time clock background command. These routines are grouped as to function and generally provide control commands to the system function modules and read status information and data from those modules. Further, communications between modules and information from and to external sources are processed. The routines begin at block A100 which represents the operation of preparing the time base corrector status for the video tape recorder. The next operation that the real time clock background routines perform in block A102 is to send any messages that have been collected for the control panels 25, 26 to that device. The messages are sent through the FIFO circuit 206 and the serial communications processor 15.

The video tape recorder port 22 is read in block A104, and data from the commands from the VTR are distributed throughout the system. Commands from the VTR include an E—E command, an edit mute command, a slow motion command, a shuttle command, and commands for advance reference and system reference control. The system control calculates error tracking data for the phased locked loop of the reference clock generator and in block A108 sends this data to the reference clock module 114.

The next group of instructions in blocks A110–A116 execute one path if the time base corrector contains a frame memory, and another path if a smaller memory is used. The determination of whether the system configuration contains a frame memory is accomplished during the initialization routine where the system control will interrogate the system function modules to determine which are present. This information is stored and can be tested in block A110 to determine if the frame memory is present. If the frame memory is present, the affirmative branch from block A110 transfers control to block A112 where the freeze select bit of the LEDS control register is set according to the value of the freeze select bit in the control register for the memory control module 110.

Next, in block A114, the freeze on/off and autosave bits are set according to the values of those variables in the flag register. These control bits are set in the LEDS control register and the memory control register. These signals when at particular logic level, enable the freeze and autosave functions in the memory control module 110 and cause particular LEDS in the time base corrector 12 to be illuminated indicating the selection of the particular function in the LEDS control register. If the time base corrector 12 does not have a frame memory as indicated by a negative branch from block A110, then the operation in block A116 is executed. In this block the freeze select and autosave bits in the LED control register are turned off because those operations are used only with a frame memory.

A group of instructions in blocks A118–A124 is used to control the heterodyne operation in the video input module 100 control register. First, the block A118 tests whether a color processor module is present as determined by the status of a memory location which was filled during the initialization routine by the interrogation of the system configuration. If the color processor module is not present, then no heterodyne function is possible and the bit is turned off in block A122. However, if there is a color processor module present in the time base corrector 12 and the heterodyne input for video is selected as indicated in block A120, then the heterodyne bit is set according to the value of the heterodyne bit in the flag words in block A124. Otherwise, the heterodyne bit is turned off by the negative block A122 after a negative branch from block A120.

For certain operations the time base corrector 12 needs to turn the burst on and off in the output composite signal. The next operation, in blocks A126–A136, allows the control of this variable. The generation of the burst is provided by the processing amplifier module 118, and control of this parameter is provided by a control bit in the control register of that module. There are three alternative paths for the control of that burst bit in the control register in the processing amplifier 118. The first path begins with block A126 where the force burst on command in the flag register is tested to determine if it is true. If the command is true, then an affirmative branch from block A126 transfers control to block A128, where the burst bit is set on in the processing amplifier 118 control register.

A second path through blocks A126 and A130 is taken if the force burst off command in the flag register is true. This path continues through an affirmative branch from block A130 to block A134 to perform the act of turning off the burst bit in the processing amplifier 118 control register. The second path to the block A134 is also taken even through the force burst off command is not true, if the monochrome shuttle command in the flag register is true as tested for in block A132. The third path through the negative branches of blocks A126, A130, and A132 leads to block A136 to set the burst bit in the processing amplifier 118 control register according to the value of the burst present bit in the flag register.

The next group of instructions, as represented by blocks A138–A142, depends upon whether or not the one line delay module 124 is present as an option. The presence of the one line delay module 124 is tested by reading the memory location which is filled during the interrogation of the system configuration during initialization. If the one line delay module 124 is present, as determined by an affirmative branch from block A138, then in block A142 the one line delay active control bit is set according to the shuttle active variable from the flag register. The one line delay active bit value is then communicated to the control registers for the video input module 100, the timing corrector module 104, and the memory control module 110, if the shuttle mode is not active. Otherwise, the one line delay bypass bit is communicated to the above mentioned registers. The one line delay active bit indicates to these particular modules whether the shuttle mode of the time base corrector 12 is active or not. However, if the one line delay module 124 is not present, then the negative branch from block A138 transfers control to block A140 where the one line delay active bit is turned off in the control registers for the video input module 100, the timing corrector module 104, and the memory control module 110.

A diagnostic group of instructions is executed next in blocks A144–A158. The diagnostic test is to determine whether or not the input signal and the reference signal are normal or standard. The diagnostics are accomplished by interrogating certain data registers of the modules involved in the input and reference signal processing for test signals. The tests begin in block A144 where the input sync present bit is tested for from the video input module 100 data register. This indicates to the system control that horizontal sync pulses are present in the input video signal.

If the test in block A144 is passed, then the reference burst present bit is tested for from the data register of the reference clock module 114. The presence of this signal indicates that the burst is present in the studio reference signal from which the reference clock and synchronizing part of the final output signal will be generated. After the test in block A146 is passed, the system control continues to block A148 where the reference clock module 114 data register is also tested to determine if horizontal sync pulses in the reference signal are present. If this test is passed, then the data register of the reference clock is again tested in block A150 to determine if the phase locked loop of the reference clock is locked. This assures that the output clock from the reference clock module 114 is in phase with the reference input signal.

Thus, when all the tests have been affirmatively passed in blocks A144–A150, the nonstandard bit in the LEDS control register is set to off in block A156. This will cause the nonstandard LED of the time base corrector 12 to remain unlit and indicate that standard operation is occurring. Further, no error message is output because the routine in block A158 sets an error message indicator to a value of zero, which disables any output.

However, if any one of the four tests in blocks A144–A150 are failed, then an alternative path through blocks A152 and A154 are taken. In block A152 the nonstandard bit for the LEDS control register is set. This will cause a display of the corresponding LED of the time base corrector 12 to indicate that nonstandard operation of the device is taking place. Further, the error message variable is set to the value of the nonstandard bits in the flag register in block A154. This will cause the error message to take on a value which, when displayed, will allow the operator to determine which variable is at fault and causing the nonstandard operation.

In blocks A160–A180 control bits in the control register of the output processor 112 are set or cleared to command the output processor to interpolate either luminance or chrominance samples of the data signal. There are three general paths through this routine. The first path is through the decisional blocks A160, A162, and A164 where the program questions whether the time base corrector 12 is in a slow motion mode, a freeze field 1 mode, or a freeze field 2 mode, respectively. These conditions are checked for by reading the flag register and interrogating the respective bits. If none of these conditions are present, then in blocks A172 and A174, the interpolate luminance bit is turned off, and the interpolate chrominance bit is turned off in the control register of the output processor 112. Another path is taken if any of the conditions of slow motion, field 1 or field 2 freeze is present. This path additionally splits at decisional block A166 depending upon whether the television standard of the input signal is SECAM or not. The SECAM standard is checked for in block A166 by testing the television standard bits in the flag register. If the television standard for the input signal is SECAM, then the path in blocks A168 and A170 is taken to turn on the interpolate luminance bit and turn off the interpolate chrominance bit in the control register of the output processor 112. However, if the television standard is not SECAM, then the interpolate luminance bit is turned on and the interpolate chrominance bit is turned on in blocks A176 and A178. Finally, the slow motion mode bit in the control register of the output processor 112 is set according to the value of the slow motion mode bit of the flag register in block A180 before finishing this part of the routine.

Thereafter, in blocks A182-A246, a series of operations are performed dependent upon whether the output processor module 112 is present in the system configuration. The system configuration is determined during the initialization process and stores an indication whether or not the module is present. This information is tested for in block A182, and alternate paths either to block A184 or to block A192, are taken depending upon whether the module exists in the configuration. In general, this part of the routine sets particular control bits in the color correction mode PROM of the system control 14 and control bits in the control register of the output processor.

If there is no output processor 112 present, the negative branch from block A182 causes execution of blocks A184-A190 to disable those functions which the output processor 112 executes and to enable alternative functions to provide color correction even without an output processor present. In block A184 the output processor module present bit is set to NO; in block A186 the decode switch bit is set to NO; and in block A188 the memory control color corrector bit is set to ON. The first two operations disable outputs from the color correction mode PROM which generally control the operation of the output processor 112, and the third operation in block A188 controls the memory control to do color correction in the absence of the output processor. Thereafter, the decode bit in the control register of the LEDS is turned off in block A190.

Alternatively, if the output processor module is present, then in blocks A192 and A194 the output processor present bit is set to YES, and the decode switch bit is set according to the value the decode switch bit of the flag register. The decode bit in the control register of the LEDS is set from the decode switch bit in the flag register in block A196. Thus, the state of the decode switch on the control panels 25, 26 is displayed in the LEDS and is transferred to the color correction mode PROM to enable or disable the color decoding function of the output processor 112. Further, the output processor 112 is enabled by the output processor present bit for color processing.

Continuing with the operations of the output processor, the next group of instructions in blocks A198-A214 allow the time base corrector 12 to alternatively enable the color correction operation for either the memory control 110 or the output processor 112 depending upon the speed of the tape and the incoming signal. In blocks A198-A206 a series of tests are performed to determine the speed mode of the VTR and whether or not the decode switch is on.

Block A198 determines whether the decode switch is on by interrogating the flag register. If the decode switch is on, then the output processor decoding function and color correction should be used in all modes of operation except in shuttle, thus, the program takes a branch to block A200.

If block A200 indicates that the VTR 10 is in shuttle then the output processor color correction is set off and the memory control color correction is set on in block A212, A214. Otherwise, if the VTR 10 is not in shuttle, the output processor color correction to set on and memory control color correction is set off in block A208, A210.

If the decode switch is off then the series of mode tests in blocks A202-A206 are performed. The failure of all these tests determine the output color processor should be set off in the color correction PROM in block A212 and the memory control color corrector should be set on in block A214. Otherwise, the special modes which turn on the output processor color corrector and turn off the memory control color corrector are the freeze mode as tested for in block A202, the slow motion mode as tested for in block A204, and a nonunity chroma level as tested for in block A206. Any of these modes will cause a path alteration to blocks A208 and A210. Thus, this operation allows for the automatic control of the output processor color corrector or memory control color corrector based on VTR tape speed. For standard tape speed, and fast shuttle speed, the memory control color corrector is used, but for freeze motion, fast and slow motion, and nonunity chroma levels the output processor color corrector is enabled.

The next set of blocks in the program A216-A222 produce signals which control the filters in the output processor 112 to be either complementary or noncomplementary. The operation for the complementary filters are used if the results of either the test in block A216 or the test in block A218 is affirmative which indicate that either a freeze mode or a slow motion has been commanded for the time base corrector 12. Therefore, in block A220 the output processor filters complementary bit is set in the control register. If neither of these conditions are present, then the negative branch from block A218 causes the program in block A222 to set the output processor filters noncomplementary bit in the control register.

Blocks A224-A232 determine whether the interpolate function of the output processor 112 will be active by testing the mode of the time base corrector 12. The interpolate function is enabled by setting the interpolate ON bit in the address input of the color correction mode PROM of the system control in block A230. This operation is in response to either finding the freeze field 1 mode in block A224, the freeze field 2 mode in block A226, or the slow motion mode in block A228. The freeze field 1 and field 2 indications are obtained from the flag register, and the slow motion mode indication is obtained from the video tape recorder port 22. If none of these conditions are present, then in block A232 the interpolate OFF bit is set in the address input of the color correction mode PROM of the system control 14.

Thereafter, as the last operation for the routine for the output processor 112, the same tests performed in blocks A198-A204 are repeated in blocks A234-A246. If the results of these tests indicate that the decode flag is present (A234) and there is no shuttle (A238), or freeze is on (A240), or there is a slow motion playback (A242), or nonstandard chroma level (A246), then the output processor decode bit is set to ON in the color correction mode PROM in block A244. However, if the decode flag is not present or it is present but the TBC is in a shuttle mode, and freeze mode is off and the slow motion mode is off, and the chroma level is standard, then the output processor decode bit is set to OFF in the color correction mode PROM in block A236.

The program continues in block A248-A256 by interrogating the data register of the video input module 100 to set certain status and control bits in the flag register and LEDS control register. In block A248, the value of the input sync present bit of the video input module data register is transferred to the input sync present bit of the flag register. Similarly in block A250, the input video level low bit of the video input module data register is transferred to the video low bit of the LEDS control register. The value of the input video high level bit of the video input module data register is then transferred to the video high bit of the LEDS control register in block A252. The process continues by setting the color processor present bit in the flag register from the value of the color processor present bit in the video input module data register in block A254. Whether the one line delay module 124 is present is obtained from the video input module data register in block A256. The value of this bit is then transferred to the one line delay present bit in the flag register. In this manner, the program indicates the status of the video input module 100 in the flag registers and also distributes that status for display by loading particular locations in the LEDS control register.

The time base corrector 12 internally measures the tape speed of the VTR 10 by determining tape subcarrier frequency and can control the modes of the time base corrector in dependence upon that speed. Particularly, a number of modules of the time base corrector need to know whether or not to enter the shuttle mode and/or whether or not to enter the monochrome mode where no color processors are enabled. The tape subcarrier frequency data is generated by measuring that parameter with circuitry also used in the development of the tape clock and is, therefore, available from the tape clock modules 108. The part of the program which sets the status and modes for shuttle and monochrome from the tape subcarrier frequency information is located in blocks A258-A276 and will now be more fully explained.

The decisions to use any color correction and which color correction to use are determined by blocks A258-A276. These modes are determined by tape speed where at normal speed the color correction should be accomplished by the memory control color corrector. At tape speeds between +3X and -1X nominal speed, a color shuttle operation is performed by the output processor color corrector. After the tape speed exceeds these limits, a monochrome shuttle operation to ±20X nominal speed is performed by the memory control color corrector. In excess of ±20X nominal speed, the color correction is switched off. Therefore, the operational modes and these speed limits must be detected from the subcarrier frequency word which indicates tape speed.

In blocks A258 and A260 the program tests whether the tape subcarrier frequency is less than or equal to a monochrome shuttle upper limit (+20X) or greater than or equal to the monochrome shuttle lower limit (−20X). If either of these conditions are affirmatively answered, then the tape speed is in the range such that the TBC should provide a monochrome shuttle operation. To execute this operation, the shuttle mode bit is set to YES and sent to control registers of the the various modules which need to process this information. In block A262, the shuttle bit is set to YES for the video input module 100 control register, the tape clock 1 module 108 control register, the tape clock 2 module 108 control register, the memory control module 110 control register, the flag register, and the color correction mode PROM. Thereafter, in block A264 the monochrome bit is set to YES in the video input module 100 control register, the analog to digital module 102 control register, the tape clock 1 module 108 control register, and the tape clock 2 module 108 control register.

If the program finds that the tape speed is not fast enough for the TBC to be in the monochrome shuttle mode, then it tests two limits for color shuttle in blocks A266 and A268. In block A266 the tape subcarrier frequency is tested to determine whether it is less than or equal to color shuttle upper limit (+3X), and in block A268 the tape subcarrier frequency is tested to determine whether it is greater than or equal to the color shuttle lower limit (−1X). If either of these conditions are present, then blocks A270 and A272 are executed to set the shuttle mode and color mode for the time base corrector. In block A270, the shuttle mode bit is set to YES in the video input module 100 control register, the tape clock 1 module 108 control register, the tape clock 2 module 108 control register, the memory control module 110 control register, the flag register, and the color correction mode PROM. Thereafter, in block A272, the monochrome bit is set OFF in the video input module 100 control register, the analog to digital module 102 control register, the tape clock 1 module 108 control register, and the tape clock 2 module 108 control register depending upon the value of the monochrome bit in the flag register. This operation provides for control of the color shuttle operation depending upon whether or not the monochrome bit is set in the flag register and upon tape speed. Normally, color shuttle will be employed with the monochrome bit turned off indicating color correction operation.

If the tests in blocks A258, A260, A266, and A268 indicate that the tape speed is not fast enough for the TBC to be in either color shuttle or monochrome shuttle mode, then in block 274 the shuttle bit is set to NO. The shuttle bit is set to NO in the various control registers for the video input module 100, tape clock 1 module 108, tape clock 2 module 108, and memory control module 110, mentioned previously. Further, the shuttle bit is set to NO in the flag register and color correction mode PROM. Thereafter, in block A276, the monochrome bit for the control registers of the video input module 100, analog to digital module 102, tape clock 1 module 108, and tape clock 2 module 108 are set depending upon the value of the monochrome bit in the flag register. This will be for normal tape speed operation (in addition to tape speeds in a range around normal which do not outstrip the color processing abilities of the TBC) with the monochrome bit turned off indicating color correction operations.

The operations end for the output processor in block A278 by setting the monochrome variable in the flag register from the value of the inverted burst present bit in the tape clock 2 module 108 data register.

Blocks A280-284 set the edit ready bit in the flag register depending upon whether the difference between the tape subcarrier phase and reference subcarrier phase are greater than 45°. If the condition is true, as tested in block A280, then an affirmative branch continues the program at block A284 where the edit ready bit is set to YES, and if the test is negative, the program branches to block A282 where the edit ready bit is set to NO.

The bargraph on the local control panel is comprised of 17 LEDS which indicate in increments of 10° the difference between the sync/burst phase for the tape and the sync/burst phase of the reference. These LEDS are controlled to display this difference based upon the measurements taken in blocks A286-A290. Initially, all the LEDS are set to an OFF condition in block A286 by clearing the control register for the bargraph. Thereafter, in block A288 the difference between the tape sync/burst phase and the reference sync/burst phase is measured in block A288. The tape sync/burst phase is obtained from the tape clock 2 module 108 data register and the reference sync/burst phase is obtained from the tape clock 2 module 108 control register. Depending upon this difference, particular bits corresponding to certain LEDS in the control register for the bargraph are set in block A290. The bargraph is comprised of a line of 17 LEDS where the middle LED (LED 9) indicates whether the phase difference is between +5°. From the middle LED to the far left LED 10° increments for each LED are used to indicate the phase difference as it increases in a positive direction to the left and to the far right LED 10° increments are used to indicate the phase difference as it increases in a negative direction to the right. Thus, the far left LED (LED 17) indicates a phase difference of greater than +75° and the far right LED (LED 1) indicates a phase difference of greater than −75°.

The next operation in the program is to set the input video advance and the reference advance in the control registers of the processing amplifier 118 and the reference clock 114. These two advance signals will depend upon whether the frame memory, or the 24 line memory is present. Therefore, in block A292 the memory control data register is interrogated to determine whether there is a frame memory present in the system configuration or a 24 line memory present. If there is a frame memory present, then the frame present bit is set in the flag register in block A294 and the input video advance is set to 28 horizontal lines in the processing amplifier 118 control register in block A296. Further, the VTR reference advance is set to 28 horizontal lines in the reference clock 114 control register in block A298. Alternatively, a negative branch from block A292 indicates that the 24 line memory is present, and this configuration is handled by setting the 24 line memory present bit to YES in the flag register in block A300. Next in blocks A302 and A304, the input video advance in the processing amplifier 118 control register and the VTR reference advance in the reference clock 114 control register are set to 16 horizontal lines.

In the next two blocks, A306 and A308, two bits in the LEDS control register are set. First, in block A306 the wrong frame bit is set according to the value of the wrong frame bit from the memory control 110 data register, and secondly, in block A308, the sync generator locked bit is set from the value of the locked bit of the reference clock 114 data register. These bits will display in the LEDS the status of these operations according to the values of the data in the particular module data registers.

A group of instructions in blocks A310-A320 is then executed to set the value of the reference vertical present bit in the reference clock 114 control register. Initially, block A310 determines whether the reference vertical present bit is set in the reference clock data register. If this bit is not set, then the reference vertical present bit in the reference clock control register is set to NO in block A314, and the vertical present delay is set to 15 frames in following block A320. The alternate path from block A310 for an affirmative response to the test, takes the program to block A312 where a test is performed to determine if the vertical present delay is equal to zero. If not, in block A316, the vertical present delay is decremented and the program continues. However, if the delay has been counted to zero, then the reference vertical present bit is set to YES in the reference clock control register by block A318. In this manner, the reference vertical present bit in the reference clock control register is set after the reference vertical is present for at least 15 frames.

Thereafter, the status bits in the flag register are updated in blocks A322 and A324 for the reference horizontal sync and the reference burst. In block A322, the reference horizontal sync present bit is set in the flag register depending upon the value of the reference horizontal sync present bit in the reference clock 114 data register. Similarly, the reference burst present bit is set in the flag register according to the value of the reference burst present bit in the reference clock 114 data register in block A324.

In generating the output waveform, the horizontal sync to reference burst phase difference should be maintained at a relatively exact value. This is accomplished with a phase locked loop in the reference clock module 114. The next portion of the system control program, blocks A326-A336, cause an analog voltage to be generated which tracks the error signal rephasing the loop in the reference clock module. If for some reason the reference with which the loop is locked is lost, the analog voltage controlled by this portion of the program will be used as an open loop reference. The voltage is generated by the microprocessor incrementing or decrementing a digital word which is converted to the analog voltage and thereafter compared to the error signal rephasing the loop. The output of the comparator is input to the microprocessor to determine if the digital word should be incremented or decremented to approach equality.

The program begins in block A326, where the reference clock 114 data register is interrogated to determine if the reference horizontal sync is present. If the horizontal sync is present, then in block A328 a test is performed to determine whether the phase locked loop (PLL) tracking direction (output of the comparison) is not equal to the last PLL tracking direction as stored in a flag register. If an affirmative answer to this test is obtained, then the tracking voltage has either just exceeded or just fallen below the error voltage because the comparitor level changed during the last pass through the program. However, if the tracking directions are equal (unchanged), as indicated by a negative branch from block A328, then the PLL tracking delay is tested in block A340 to determine if it is equal to zero. If not yet equal to zero, the PLL tracking delay is decremented in block A342 before continuing. However, if the PLL tracking delay is zero, then the sync generator locked bit is set to NO in block A344 before continuing. If the program cannot cause a change in the comparison during the delay interval then it cannot track to error voltage.

In block A330 the PLL tracking direction from the sync generator data register is tested to determine if the direction is positive which means the tracking voltage is less than the error voltage. If the answer to this test is affirmative, then in block A331 the PLL tracking data is tested against the PLL tracking data maximum value. If they are not yet equal, then the PLL tracking data is incremented in block A332 to increase the tracking voltage. However, if they are equal, the program continues to block A334 immediately. If the PLL tracking direction is not positive as determined by a negative branch from block A330, then in block A346 the PLL tracking data is tested against the PLL tracking data minimum value. If the PLL tracking data value has not reached the minimum yet, then in block A348 the PLL tracking data is decremented to decrease the tracking voltage. However, if they are equal, the program continues immediately to block A334. In block A334 the PLL tracking delay is reset to 15 frames, and in block A336 the reference clock locked bit is set to YES in the flag register. Thereafter, the program continues to block A338 where the PLL tracking direction bit in the flag register is set according to the value of the PLL tracking direction bit of the reference clock 114 data register to upate the value.

In this manner, the system control maintains an tracking voltage locked to a phase locked loop error voltage by constantly checking the tracking direction against a stored tracking direction. The tracking voltage is incremented in the direction of the tracking direction until the error voltage is exceeded. By always forcing the tracking voltage in the tracking direction which switches over a very small increment, a limit cycle is set up which indicates the tracking voltage is locked to the error voltage. If the reference and hence error voltage is lost, then the tracking voltage is latched to provide an open loop reference for the PLL.

The next part of the program comprising blocks A340-A354 causes selected variables in the reference clock control register to be set. Initially in block A340, a test is performed on the reference clock 114 data register to determine if the reference burst present bit is set. If the reference burst is not present, then the following operations do not need to be performed, and blocks A342-A354 are bypassed. However, if the reference burst is present, then in block A342 the reference sync/burst phase is set to the average of the last 8 samples of the reference sync/burst phase as measured from the reference clock 114 data register. This value is stored in the reference clock 114 control register.

Next, in block A344, the reference sync/burst phase contained in the reference clock control register is tested to determine if it is greater than 45°. If it is then the amber LED of the reference clock control register is set to ON, otherwise the amber LED of the reference clock 114 control register is set to OFF. Another test is performed on the reference sync/burst phase stored in the reference clock 114 control register to determine if it is greater than 95°. If it is, then the invert 7.8 KHz. phase bit is set to YES and, otherwise, the invert 7.8 KHz. phase bit is set to NO in the reference clock control registers by blocks A352 and A354. The signal is used by the system to change field designation because of the large phase error.

Following these operations is a test in block A356 to determine if the TV standard bits stored in the flag register match the TV standard set on the switches of the system control module 14. If they do not match, then the TV standard bits of the flag register are changed to equal those of the switches in block A358 and then the program jumps to the reinitialization routine. If the TV standard bits in the flag register equal those of the switches, then the program continues to block A360. This operation is accomplished to assure that after start up, the TBC system control would reinitialize all system parameters to those according to the actually selected by a new switch setting. Every time through the real time clock background routine the program will match the switches to the flag register to make sure that they are equal. Finding nonequality, the flag register will be reset with the switch values and the entire system reinitialized. The system must be reinitialized because different TV standards require different standard values of variables and different ranges of adjustments In addition to testing the switches for the TV standard, blocks A360-A370 set the control registers of the processing amplifier 118 and reference clock 114 according to values set in the operator switches. Block A360 sets the advance reference of the reference clock 114 control register according to the switches. Block A362 sets the PAL 25 Hz. offset bit ON/OFF in the reference clock 114 control register according to the switches. The SECAM burst/bottle bit of the reference clock 114 control register is set according to the values of the operator switches in block A364. Thereafter, the SECAM burst/bottle bit in the processing amplifier 118 control register is set according to the values of the switches in block A366. The vertical information test signal line blanking bits for the reference clock 114 control register are then set according to the values in the switches in block A368. Following this operation, the horizontal blanking narrow/wide bit for the reference clock 114 control register is set from values in the switches in block A370.

Once the switches have been transferred to the respective control register, the values for the keyboard are input. There are a number of key procedures which correspond to the keys input to control and regulate operations of the time base corrector. The keyboard values enter the time base corrector 12 through the serial data communication processor 15 such that a keyboard buffer and keyboard temporary buffer can be read to determine the actuation or a change of status of a particular key. Thus, in block A372 the keyboard buffer is tested to determine whether it contains a key released value. The key released test is performed in block A374 and if affirmative, passes control of the program to block A378. If a key has just been released, then the corresponding key timer is set to zero in block A376. Otherwise, the key timer is tested against corresponding key delay to determine if they are equal in block A378. If they are equal, then the key has been held a sufficient time as to indicate that an automatic repeat function should be initiated. If the key timer does not yet equal the key delay value, as determined by a negative branch from block A378, then the key timer is incremented in block A382.

Thereafter, the keyboard temporary buffer is compared to the keyboard buffer bit by bit to determine if the key status has changed. If the key was released and the status has changed, as determined in block A386, then the key procedure corresponding to that particular key should be executed. This is accomplished by appending the key procedure number to the queue in the background routine in block A388. This operation permits the input keys to be debounced and read on a real time basis as they are pressed but further allow the key procedure to be executed as the program has time.

Thereafter, in block A390, a number of time base corrector parameters are compared to their unity values. The black video level and output sync/burst phase of the processing amplifier 118 control register are compared to their unity values. The chroma level and output sync/burst phase of the output processor control register are compared to their unity levels. The chroma phase of the video output module 120 control register and the input sync/burst phase reference of the tape clock 1 module 108 control register are compared to their unity values. If any of these values equal their unity values, then in block A392 the program transfers control to block A394 where the corresponding bits of the unity LEDS control registers are set. This operation displays an LED whenever the corresponding parameter equals a unity or standard value. The program then reverts back to the background procedures to continue processing until either interrupted or the beginning of the next pass.

While a preferred embodiment of the invention has been illustrated, it will be obvious to those skilled in the art that various modifications and changes may be made thereto without departure from the spirit and scope of the invention as defined in the appended claims.

What is claimed is:

1. A digital time base corrector for correcting time base errors in an input video signal represented by digitized video data samples and for outputting an output video signal stabilized relative to a reference signal, said time base corrector comprising:

a plurality of system function means for processing video data by receiving said input video signal, correcting time base errors, and outputting said output video signal, each of more than one of the system function means including at least one register which is operable upon being addressed for reading control data therefrom or writing control data thereto; and system control means including
a single system control bus for selecting and communicating with all said registers included within said more than one of the system function means, and
a control processor for communicating control data over said single system control bus to and from all said registers included within said more than one of the system function means for controlling said more than one of the system function means, said control processor having a memory space into which addresses for selecting said registers are mapped.

2. A digital time base corrector as set forth in claim 1 wherein:
said system function means comprise means for processing video data at a video data rate; and
said system control means comprise means for processing control data at a rate slow relative to said video data rate.

3. A digital time base corrector as set forth in claim 1 wherein:
said more than one of the system function means includes at least one system function means that presents to said single system control bus control data indicative of the status of the video signal processing;
said more than one of the system function means includes at least one other system function means responsive to function control data received from single system control bus for performing a function called for by said function control data; and
said control processor includes means for retrieving said indicative control data from said at least one system function means over said single system control bus and, in response thereto, presenting to said at least one other function means over said single system control bus function control data calling for performance of a function.

4. A digital time base corrector as set forth in claim 1 wherein:
said more than one of the system function means includes at least one system function means responsive to function control data received from said single system control bus for performing a function called for by said function control data; and
said control processor includes means for accepting operator commands from an operator and, in response thereto, presenting to said at least one system function means over said single system control bus function control data calling for performance of a function.

5. A digital time base corrector as set forth in claim 1 wherein:
said more than one of the system function means includes at least one system function means that presents control data to said single system control bus indicative of the status of the video signal processing;
said more than one of the system function means includes at least one other system function means responsive to function control data received from said single system control bus for performing a function called for by said function control data; and
said control processor includes means for retrieving said indicative control data from said at least one system function means over said single system control bus and, in response thereto and in response to receiving at least one operator command, presenting to said at least one other function means over said single system control bus function control data calling for performance of a function.

6. A digital time base corrector in accordance with claim 1 wherein:
said registers each comprises a data transfer latch having data lines connecting to said single system control bus and having at least one select line connecting individually to said single system control bus; and said control processor is adapted to access said registers by decoding an address of its memory space as one of said select lines and by transferring control data over said single system control bus between said control processor and the latch selected by said one of said select lines.

7. A digital time base corrector in accordance with claim 6 wherein:

at least one of said data transfer latches is a write only latch having a data inputs and a clock input to latch data into the latch, said data and clock inputs of said latch being connected respectively to the data and select lines for said latch; and said control processor sends control data over said single system control bus to said write only latch.

8. A digital time base corrector in accordance with claim 6 wherein:

at least one of said data transfer latches is a read only latch having data outputs and an output enable input to transmit data from the latch, said data outputs and output enable inputs of said latch being connected respectively to the data and select lines for said latch; and said control processor accepts control data over said single system control bus from said write only latch.

9. A digital time base corrector for correcting time base errors in an input analog composite color video signal and for outputting an output analog composite color video signal stabilized relative to a stable reference signal, said time base corrector comprising:

a plurality of system function means including video input means for receiving said input analog composite color video signal uncorrected for time base errors, video output means for outputting said output analog composite color video signal, analog to digital converter means for sampling said input analog composite video signal and for generating digitized video data samples representing said input analog composite color video signal, first clock means for generating a write clock signal at a first clock rate synchronously with timing components of said input analog composite video signal including the time base errors, second clock means for generating a read clock signal at a second clock rate synchronously with timing components of said stable reference signal to provide a stable time base, digital memory means for storing said digitized video data samples, means responsive to said write clock signal for writing said digitized video data samples into said digital memory means synchronously with the unstable time base components of said input analog composite video signal, means responsive to said read clock signal for reading said digitized video data samples from said memory means synchronously with the stable time base of said reference signal thereby converting said digitized video data samples having an unstable time base to digitized video data samples having a stable time base, and digital to analog converter means for receiving said stabilized digitized video data samples and for converting them into said output analog composite color video signal, more than one of said plurality of system function means including at least one register operable upon being addressed for reading control data therefrom or writing control data thereto; and system control including a single system control bus for selecting and communicating with all said registers included within said more than one of the system function means, and a control processor for communicating control data over said single system control bus to and from said registers for controlling said more than one of the system function means, said control processor having a memory space into which addresses for selecting said registers are mapped, for processing received information concerning the status or operation of the said more than one of the plurality of system function means according to programmed instructions to generate control data for regulating the operation of said more than one of the plurality of the system function means via the respective addressed register to provide at least one of the group consisting of operator control of at least one of the system function means, information transfer between at least two of the system function means, and information transfer from or to at least one of the system function means.

10. A digital time base corrector as set forth in claim 9 wherein said plurality of system function means further includes:

processing amplifier means for modifying the values of various parameters of said time base corrected output analog composite color video signal.

11. A digital time base corrector as set forth in claim 9 wherein said plurality of system function means further includes:

waveform generator means for generating digitized video data samples forming a waveform envelope of synchronizing pulses for combination with said digitized video data samples prior to their being converted into said output analog video composite signal by said digital to analog converter means.

12. A digital time base corrector as set forth in claim 9 which further includes:

control data transfer means for communicating with an operator control panel which includes at least one control data transfer register adapted to transfer information over said single system control bus, said control data transfer means generating a control data transfer interrupt indicating control data are present in said at least one control data transfer register;

means for generating a timing interrupt periodically for dividing the operation o said control processor into real time intervals; and interrupt decoding circuitry for indicating the occurrence of either said control data transfer interrupt or said timing interrupt, and for decoding which of said interrupts has occurred.

13. A digital time base corrector as set forth in claim 12 which further includes:

means for executing a plurality of real time operations upon the occurrence of said timing interrupts; and means for transferring control data to said system control means from said control data transfer means after said real time operations if said control data transfer interrupt is present.

14. A digital time base corrector as set forth in claim 13 which further includes:
means responsive to completion of said real time operations for clearing said timing interrupt.

15. A digital time base corrector as set forth in claim 14 which further includes:
means for clearing said control data transfer interrupt after all the control data stored in said control data transfer registers have been transferred to said system control means.

16. A digital time base corrector for correcting time base errors in an input video signal represented by digitized video data samples and for outputting an output video signal stabilized relative to a reference signal, said time base corrector comprising:
a plurality of system function means including
video input means for receiving said input video signal uncorrected for time base errors,
video output means for outputting said output video signal,
first clock means for generating a write clock signal at a first clock rate synchronously with timing components of said input video signal including the time base errors,
second clock means for generating a read clock signal at a second clock rate synchronously with timing components of said reference signal to provide a stable time base,
digital memory means for storing said digitized video data samples,
means responsive to said write clock signal for writing said digitized video data samples onto said digital memory means synchronously with the unstable time base of said input video signal, and
means responsive to said read clock signal for reading said digitized video data samples from said digital memory means synchronously with the stable time base of said reference signal thereby converting said digitized video data samples having an unstable time base to digitized video data samples having said stable time base,
more than one of said plurality of system function means including at least one register operable upon being addressed for reading control data therefrom or writing control data thereto; and
system control means including
a single system control bus for selecting and communicating with all said registers included within said more than one of the system function means, and
a control processor for communicating control data over said single system control bus to and from said registers for controlling said more than one of the system function means, said control processor having a memory space into which addresses for selecting said registers are mapped, for processing received information concerning the status or operation of the said more than one of the plurality of system function means according to programmed instructions to generate control data for regulating the operation of said more than one of the plurality of the system function means via the respective addressed register to provide at least one of the group consisting of
operator control of at least one of the system function means,
information transfer between at least two of the system function means, and
information transfer from or to at least one of the system function means.

17. A digital time base corrector as set forth in any one of claim 1, 9, and 16 wherein said plurality of system function means further includes:
dropout compensation means for correcting video signal dropout.

18. A digital time base corrector as set forth in any one of claims 1, 9, and 16 wherein said plurality of system function means further includes:
output processor means for color correcting said digitized video samples after they have been time base corrected.

19. A digital time base corrector as set forth in any one of claim 1, 9, and 16 wherein the input video signal is a composite video signal having a color component, including a color burst signal, incoherent with a horizontal signal, and said plurality of system function means further includes:
input means responsive to the color burst signal for processing the input video signal to render the color component coherent with the horizontal sync signal.

20. A digital time base corrector as set forth in any one of claims 1, 9, and 16 wherein said plurality of system function means further includes:
memory control means for coordinating the reading and writing of said digitized video data samples to and from said memory means.

21. A digital time base corrector as set forth in claim 16 which further includes:
control data transfer means for communicating with an operator control panel which includes at least one control data transfer register adapted to transfer information over said single system control bus, said control data transfer means generating a control data interrupt indicating control data are present in said at least one data transfer register;
means for generating a timing interrupt periodically for dividing the operation of said control processor into real time intervals; and
interrupt decoding circuitry for indicating the occurrence of either said control data transfer interrupt or said timing interrupt, and for decoding which of said interrupts has occurred.

22. A digital time base corrector as set forth in claim 21 which further includes:
means for executing a plurality of real time operations upon the occurrence of said timing interrupts; and
means for transferring control data to said system control means from said control data transfer means after said real time operations if said control data transfer interrupt is present.

23. A digital time base corrector as set forth in claim 22 which further includes:
means responsive to completion of said real time operations for clearing said timing interrupt.

24. A digital time base corrector as set forth in claim 23 which further includes:
means for clearing said control data transfer interrupt after all the control data stored in said data transfer registers have been transferred to said system control means.

25. A digital time base corrector as set forth in any one of claims 1, 9, and 16 wherein said plurality of system function means further includes:
   a control panel for inputting operator commands to said system control means and other said system function means.

26. A digital time base corrector as set forth in claim 25 further including:
   a serial data communications processor for receiving and transmitting serially communicated control data and processing said serially communicated control data into paralleled communicated control data, said control panel communicating with said system control means through said serial data communications processor.

27. A digital time base corrector as set forth in claim 26 wherein:
   said serial data communications processor is microprocessor based and has a communications data bus and data transfer means coupled to said communications data bus, said data transfer means having at least one data transfer register coupled through a bidirectional data port to said communications data bus and coupled to said single system control bus through another bidirectional data port.

28. A digital time base corrector as set forth in claim 27 wherein said data transfer means includes:
   block count register means for indicting the number of data words to be transferred from the communications data bus to said system control bus; and
   interrupt means for generating an interrupt signal to said serial data communications processor when data have been loaded into said data transfer register for transfer to said communications processor and for generating an interrupt signal to said control processor of said system control means when data have been loaded into said data transfer register for transfer to said system control means.

* * * * *